US011260514B2

(12) United States Patent
Hoossainy et al.

(10) Patent No.: US 11,260,514 B2
(45) Date of Patent: Mar. 1, 2022

(54) EXTERNALLY ATTACHABLE TRACKING MODULE FOR A POWER TOOL

(71) Applicant: MILWAUKEE ELECTRIC TOOL CORPORATION, Brookfield, WI (US)

(72) Inventors: Tauhira Hoossainy, Milwaukee, WI (US); Christopher J. Metcalf, Wauwatosa, WI (US); Logan M. Hietpas, Shorewood, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 343 days.

(21) Appl. No.: 16/202,908

(22) Filed: Nov. 28, 2018

(65) Prior Publication Data

US 2019/0160646 A1 May 30, 2019

Related U.S. Application Data

(60) Provisional application No. 62/592,181, filed on Nov. 29, 2017.

(51) Int. Cl.
*B25F 5/00* (2006.01)
*H04W 4/029* (2018.01)
(Continued)

(52) U.S. Cl.
CPC ............... *B25F 5/001* (2013.01); *B25F 5/00* (2013.01); *G01S 19/33* (2013.01); *H04W 4/029* (2018.02); *H04W 64/003* (2013.01)

(58) Field of Classification Search
CPC combination set(s) only.
See application file for complete search history.

(56) References Cited

U.S. PATENT DOCUMENTS

| 5,809,432 A | 9/1998 | Yamashita |
| 6,536,536 B1 | 3/2003 | Gass et al. |

(Continued)

FOREIGN PATENT DOCUMENTS

| CN | 203956880 U | 11/2014 |
| CN | 107877457 A | 4/2018 |

(Continued)

OTHER PUBLICATIONS

United States Patent Office Notice of Allowance for U.S. Appl. No. 16/056,710 dated Aug. 16, 2019 (8 pages).

(Continued)

*Primary Examiner* — Thomas S McCormack
(74) *Attorney, Agent, or Firm* — Michael Best & Friedrich LLP

(57) ABSTRACT

A power tool tracking clip includes a wireless beacon transmitter having a memory that stores an identifier and a transmitter configured to wirelessly transmit the identifier. A clip body member has a beacon receptacle, and the wireless beacon transmitter is positioned within the beacon receptacle. A first arm member is coupled to a first end of the clip body and has a first inner surface configured to engage a power tool. A second arm member is coupled to a second end of the clip body and has a second inner surface configured to engage the power tool. A mounting feature on the first arm member aligns with a corresponding mounting feature on a corresponding outer wall of the power tool when the power tool tracking clip is mated to the power tool.

20 Claims, 14 Drawing Sheets

(51) Int. Cl.
*H04W 64/00* (2009.01)
*G01S 19/33* (2010.01)

(56) References Cited

U.S. PATENT DOCUMENTS

| | | |
|---|---|---|
| 6,607,041 B2 | 8/2003 | Suzuki et al. |
| 6,834,730 B2 | 12/2004 | Gass et al. |
| 6,872,121 B2 | 3/2005 | Wiesner et al. |
| 6,913,087 B1 | 7/2005 | Brotto et al. |
| 7,022,924 B2 | 4/2006 | Patton |
| 7,036,605 B2 | 5/2006 | Suzuki et al. |
| 7,093,668 B2 | 8/2006 | Gass et al. |
| 7,121,358 B2 | 10/2006 | Gass et al. |
| 7,146,667 B2 | 12/2006 | Elsener |
| 7,237,990 B2 | 7/2007 | Deng |
| 7,253,736 B2 | 8/2007 | Tethrake et al. |
| 7,256,699 B2 | 8/2007 | Tethrake et al. |
| 7,298,240 B2 | 11/2007 | Lamar |
| 7,311,025 B1 | 12/2007 | Wilson, Jr. |
| 7,328,752 B2 | 2/2008 | Gass et al. |
| 7,373,681 B2 | 5/2008 | Elsener |
| 7,513,179 B2 | 4/2009 | Wilson, Jr. |
| 7,540,334 B2 | 6/2009 | Gass et al. |
| 7,608,790 B2 | 10/2009 | Patton |
| RE41,160 E | 3/2010 | Gilmore et al. |
| RE41,185 E | 3/2010 | Gilmore et al. |
| 7,784,104 B2 | 8/2010 | Innami et al. |
| 7,827,718 B2 | 11/2010 | Luebkert et al. |
| 7,837,694 B2 | 11/2010 | Tethrake et al. |
| 7,850,071 B2 | 12/2010 | Sakamoto et al. |
| 7,887,559 B2 | 2/2011 | Deng et al. |
| 7,896,098 B2 | 3/2011 | Suzuki et al. |
| 7,942,084 B2 | 5/2011 | Wilson, Jr. et al. |
| 7,969,116 B2 | 6/2011 | Aradachi et al. |
| 8,035,487 B2 | 10/2011 | Malackowski |
| 8,062,060 B2 | 11/2011 | Rejman |
| 8,066,533 B2 | 11/2011 | Tomita et al. |
| 8,115,621 B2 | 2/2012 | Rajala et al. |
| 8,157,826 B2 | 4/2012 | Deng et al. |
| 8,169,298 B2 | 5/2012 | Wiesner et al. |
| 8,189,043 B2 | 5/2012 | Schneider et al. |
| 8,200,354 B2 | 6/2012 | Freeman et al. |
| 8,210,275 B2 | 7/2012 | Suzuki et al. |
| 8,251,157 B2 | 8/2012 | Gray et al. |
| 8,253,559 B2 | 8/2012 | Howard et al. |
| 8,253,560 B2 | 8/2012 | Howard et al. |
| 8,254,878 B2 | 8/2012 | Howard et al. |
| 8,264,374 B2 | 9/2012 | Obutake et al. |
| 8,274,273 B2 | 9/2012 | Nguyen et al. |
| 8,285,248 B2 | 10/2012 | Howard et al. |
| 8,406,697 B2 | 3/2013 | Arimura et al. |
| 8,412,179 B2 | 4/2013 | Gerold et al. |
| 8,454,613 B2 | 6/2013 | Tethrake et al. |
| 8,500,769 B2 | 8/2013 | Deng |
| 8,535,342 B2 | 9/2013 | Malackowski et al. |
| 8,555,755 B2 | 10/2013 | Cattaneo |
| 8,588,806 B2 | 11/2013 | Howard et al. |
| 8,624,721 B2 | 1/2014 | Barker, Jr. et al. |
| 8,630,729 B2 | 1/2014 | Freeman et al. |
| 8,659,652 B2 | 2/2014 | Schneider et al. |
| 8,666,936 B2 | 3/2014 | Wallace |
| 8,686,831 B2 | 4/2014 | Fgreen et al. |
| 8,764,466 B2 | 7/2014 | Million |
| 8,766,798 B2 | 7/2014 | Howard et al. |
| 8,768,381 B2 | 7/2014 | Howard et al. |
| 8,776,644 B2 | 7/2014 | Harper et al. |
| 8,847,754 B2 | 9/2014 | Buchheim et al. |
| 8,847,755 B2 | 9/2014 | Howard et al. |
| 8,851,200 B2 | 10/2014 | Gray et al. |
| 8,870,078 B2 | 10/2014 | Webb et al. |
| 8,878,671 B2 | 11/2014 | Buchheim et al. |
| 8,884,756 B2 | 11/2014 | Howard et al. |
| 8,884,871 B2 | 11/2014 | Howard et al. |
| 8,890,686 B2 | 11/2014 | Howard et al. |
| 8,896,457 B2 | 11/2014 | Howard et al. |
| 8,928,463 B2 | 1/2015 | Landau et al. |
| 8,938,315 B2 | 1/2015 | Freeman et al. |
| 8,981,952 B2 | 3/2015 | Howard et al. |
| 8,988,522 B2 | 3/2015 | Schneider et al. |
| 9,041,528 B2 | 5/2015 | Howard et al. |
| 9,049,641 B2 | 6/2015 | Wible et al. |
| 9,078,481 B2 | 7/2015 | Howard et al. |
| 9,082,277 B2 | 7/2015 | Howard et al. |
| 9,089,952 B2 | 7/2015 | Gatling et al. |
| 9,129,499 B2 | 9/2015 | Howard et al. |
| 9,189,663 B2 | 11/2015 | Goren et al. |
| 9,196,881 B2 | 11/2015 | Gray et al. |
| 9,232,357 B2 | 1/2016 | Buchheim et al. |
| 9,256,988 B2 | 2/2016 | Wenger et al. |
| 9,295,024 B2 | 3/2016 | Howard et al. |
| 9,367,062 B2 | 6/2016 | Volpert |
| 9,392,404 B2 | 7/2016 | Daoura et al. |
| 9,430,928 B2 | 8/2016 | Ikeda et al. |
| 9,449,268 B2 | 9/2016 | Goren et al. |
| 9,466,198 B2 | 10/2016 | Burch et al. |
| 9,467,862 B2 | 10/2016 | Zeiler et al. |
| 9,491,578 B1 | 11/2016 | Saucedo |
| 9,495,847 B2 | 11/2016 | Howard et al. |
| 9,501,883 B2 | 11/2016 | Handville et al. |
| 9,537,335 B2 | 1/2017 | Furui et al. |
| 9,547,965 B2 | 1/2017 | Goren et al. |
| 9,564,774 B2 | 2/2017 | Daoura et al. |
| 9,576,235 B2 | 2/2017 | Kim et al. |
| 9,577,450 B2 | 2/2017 | Yoshikawa et al. |
| 9,595,839 B2 | 3/2017 | Furui et al. |
| 9,626,851 B2 | 4/2017 | Xi et al. |
| 9,639,722 B2 | 5/2017 | Landau et al. |
| 9,664,808 B2 | 5/2017 | Nguyen et al. |
| 9,672,708 B2 | 6/2017 | Goren et al. |
| 9,693,024 B2 | 6/2017 | Schneider et al. |
| 9,707,026 B2 | 7/2017 | Malackowski et al. |
| 9,711,017 B2 | 7/2017 | Howard et al. |
| 9,713,116 B2 | 7/2017 | Wible et al. |
| 9,715,807 B2 | 7/2017 | Howard |
| 9,756,402 B2 | 9/2017 | Stampfl et al. |
| 9,759,402 B2 | 9/2017 | Stampfl et al. |
| 9,779,601 B2 | 10/2017 | Goren et al. |
| 9,780,583 B2 | 10/2017 | Furui et al. |
| 9,819,132 B2 | 11/2017 | Peloquin et al. |
| 9,833,890 B2 | 12/2017 | Ito et al. |
| 9,875,629 B2 | 1/2018 | Goren et al. |
| 9,888,300 B2 | 2/2018 | Stampfl et al. |
| 9,892,626 B2 | 2/2018 | Daoura et al. |
| 9,908,182 B2 | 3/2018 | Phillips et al. |
| 9,916,739 B2 | 3/2018 | Suzuki |
| 9,942,700 B2 | 4/2018 | Howard et al. |
| 9,943,746 B2 | 4/2018 | Kennard et al. |
| 9,955,993 B2 | 5/2018 | Deng |
| 9,967,713 B2 | 5/2018 | Buchheim et al. |
| 9,973,831 B2 | 5/2018 | Mejegard et al. |
| 9,979,149 B2 | 5/2018 | Peloquin et al. |
| 9,986,212 B2 | 5/2018 | Schneider et al. |
| 10,022,853 B1 | 7/2018 | Mollica |
| 10,049,549 B2 | 8/2018 | Howard |
| 10,051,910 B2 | 8/2018 | Howard et al. |
| 10,074,049 B2 | 9/2018 | Daoura et al. |
| 10,090,692 B2 | 10/2018 | Yoshikawa et al. |
| 10,123,161 B2 | 11/2018 | Howard et al. |
| 10,124,455 B2 | 11/2018 | Ito et al. |
| 10,131,042 B2 | 11/2018 | Mergener et al. |
| 10,131,043 B2 | 11/2018 | Mergener et al. |
| 10,136,198 B2 | 11/2018 | Stampfl et al. |
| 10,213,908 B2 | 2/2019 | Mergener et al. |
| 10,277,964 B2 | 4/2019 | Stampfl et al. |
| 10,295,990 B2 | 5/2019 | Dey, IV et al. |
| 10,322,522 B2 | 6/2019 | DeCicco et al. |
| 10,354,181 B2 | 7/2019 | Freienstein et al. |
| 10,368,186 B2 | 7/2019 | Stampfl et al. |
| 10,380,883 B2 | 8/2019 | Matson et al. |
| 10,391,622 B2 | 8/2019 | Tanaka et al. |
| 10,396,573 B2 | 8/2019 | Furui et al. |
| 10,398,032 B1 | 8/2019 | Bailey et al. |
| 10,424,189 B2 | 9/2019 | Daoura et al. |
| 10,431,064 B2 | 10/2019 | Howard |

(56) References Cited

U.S. PATENT DOCUMENTS

| | | |
|---|---|---|
| 10,440,501 B2 | 10/2019 | Howard et al. |
| D867,909 S | 11/2019 | Kachar |
| 10,510,199 B2 | 12/2019 | Hoossainy et al. |
| 10,516,920 B2 | 12/2019 | Stampfl et al. |
| 10,518,343 B2 | 12/2019 | Ogino et al. |
| 10,569,398 B2 | 2/2020 | Mergener et al. |
| 2002/0110431 A1 | 8/2002 | Dils et al. |
| 2003/0090239 A1 | 5/2003 | Sakakibara |
| 2003/0093103 A1 | 5/2003 | Malackowski et al. |
| 2004/0108120 A1 | 6/2004 | Wiesner et al. |
| 2004/0135692 A1 | 7/2004 | Below et al. |
| 2004/0198382 A1 | 10/2004 | Hammond |
| 2005/0075149 A1 | 4/2005 | Gerber et al. |
| 2005/0173142 A1 | 8/2005 | Cutler et al. |
| 2005/0197093 A1 | 9/2005 | Wiklof et al. |
| 2005/0267988 A1 | 12/2005 | Ferguson et al. |
| 2006/0179473 A1 | 8/2006 | Innami et al. |
| 2008/0125040 A1 | 5/2008 | Kalayjian |
| 2008/0135272 A1* | 6/2008 | Wallgren ............... H01M 50/20 173/217 |
| 2008/0177267 A1 | 7/2008 | Sands et al. |
| 2008/0196910 A1 | 8/2008 | Radle et al. |
| 2008/0238609 A1 | 10/2008 | Wiesner et al. |
| 2008/0252446 A1 | 10/2008 | Dammertz |
| 2009/0145187 A1 | 6/2009 | Deppner et al. |
| 2009/0251330 A1 | 10/2009 | Gerold et al. |
| 2010/0096151 A1 | 4/2010 | Ostling |
| 2010/0186976 A1 | 7/2010 | Tsubakimoto et al. |
| 2010/0265097 A1 | 10/2010 | Obatake et al. |
| 2010/0295665 A1* | 11/2010 | Landau ............... G08B 21/0288 340/10.42 |
| 2011/0003504 A1 | 1/2011 | Rejman |
| 2011/0073343 A1 | 3/2011 | Sawano et al. |
| 2011/0253402 A1 | 10/2011 | Aradachi et al. |
| 2012/0169485 A1 | 7/2012 | Eckert |
| 2012/0292070 A1 | 11/2012 | Ito et al. |
| 2012/0304367 A1 | 12/2012 | Howard et al. |
| 2013/0109375 A1 | 5/2013 | Zeiler et al. |
| 2013/0256349 A1 | 10/2013 | Styth et al. |
| 2013/0267247 A1 | 10/2013 | Wible et al. |
| 2013/0295426 A1 | 11/2013 | Halavart et al. |
| 2013/0296910 A1 | 11/2013 | Deng |
| 2013/0313925 A1 | 11/2013 | Mergener et al. |
| 2013/0344885 A1 | 12/2013 | Parisi et al. |
| 2014/0031831 A1 | 1/2014 | Malackowski et al. |
| 2014/0070924 A1 | 3/2014 | Wenger et al. |
| 2014/0132411 A1 | 5/2014 | Buchheim et al. |
| 2014/0151079 A1 | 6/2014 | Furui et al. |
| 2014/0158389 A1 | 6/2014 | Ito et al. |
| 2014/0159662 A1 | 6/2014 | Furui et al. |
| 2014/0180464 A1 | 6/2014 | Koerber |
| 2014/0184397 A1 | 7/2014 | Volpert |
| 2014/0240125 A1 | 8/2014 | Burch et al. |
| 2014/0326477 A1 | 11/2014 | Thorson et al. |
| 2014/0367134 A1 | 12/2014 | Phillips et al. |
| 2015/0054627 A1 | 2/2015 | Landau et al. |
| 2015/0133170 A1 | 5/2015 | Buchheim et al. |
| 2015/0195807 A1 | 7/2015 | Wible et al. |
| 2015/0197093 A1 | 7/2015 | Berry et al. |
| 2015/0219257 A1 | 8/2015 | Harper et al. |
| 2015/0286209 A1 | 10/2015 | Kreuzer et al. |
| 2015/0316913 A1 | 11/2015 | Rickey et al. |
| 2015/0340921 A1 | 11/2015 | Suda et al. |
| 2015/0356861 A1 | 12/2015 | Daoura et al. |
| 2016/0019512 A1 | 1/2016 | Buchheim et al. |
| 2016/0048122 A1 | 2/2016 | Lukosz et al. |
| 2016/0171788 A1 | 6/2016 | Wenger et al. |
| 2016/0226132 A1 | 8/2016 | Kim et al. |
| 2016/0311094 A1 | 10/2016 | Mergener et al. |
| 2016/0325391 A1 | 11/2016 | Stampfl et al. |
| 2016/0342151 A1 | 11/2016 | Dey, IV et al. |
| 2017/0008159 A1 | 1/2017 | Boeck et al. |
| 2017/0201295 A1 | 7/2017 | Kusakawa |
| 2017/0201853 A1 | 7/2017 | Chen et al. |
| 2017/0216986 A1 | 8/2017 | Dey, IV et al. |
| 2017/0259422 A1 | 9/2017 | Takeyama et al. |
| 2017/0303984 A1 | 10/2017 | Malackowski |
| 2017/0343966 A1 | 11/2017 | Schadow et al. |
| 2018/0071907 A1 | 3/2018 | Myhill |
| 2018/0076639 A1 | 3/2018 | Furui et al. |
| 2018/0104802 A1 | 4/2018 | Mergener et al. |
| 2018/0114423 A1 | 4/2018 | Goren et al. |
| 2018/0126537 A1 | 5/2018 | Tanaka et al. |
| 2018/0133873 A1 | 5/2018 | Mergener et al. |
| 2018/0154456 A1 | 6/2018 | Phillips et al. |
| 2018/0199955 A1 | 7/2018 | Deng |
| 2018/0302753 A1 | 10/2018 | Langton |
| 2018/0319003 A1 | 11/2018 | Freienstein et al. |
| 2018/0322376 A1 | 11/2018 | Henry et al. |
| 2018/0345474 A1 | 12/2018 | Brennenstuhl et al. |
| 2018/0354118 A1 | 12/2018 | Brennenstuhl et al. |
| 2018/0357523 A1 | 12/2018 | Freienstein et al. |
| 2019/0026619 A1 | 1/2019 | Cecchin et al. |
| 2019/0027002 A1 | 1/2019 | Esenwein et al. |
| 2019/0043292 A1 | 2/2019 | Hoossainy et al. |
| 2019/0103012 A1 | 4/2019 | Daoura et al. |
| 2019/0160646 A1 | 5/2019 | Hoossainy et al. |
| 2019/0215584 A1 | 7/2019 | Stampfl et al. |
| 2019/0219990 A1 | 7/2019 | Dey, IV et al. |
| 2019/0298122 A1 | 10/2019 | Tahara et al. |
| 2019/0299386 A1 | 10/2019 | Tanaka et al. |
| 2019/0334357 A1 | 10/2019 | Furui et al. |
| 2020/0094393 A1 | 3/2020 | Schadow et al. |

FOREIGN PATENT DOCUMENTS

| | | |
|---|---|---|
| DE | 8102453 U1 | 9/1982 |
| DE | 10238710 A1 | 3/2003 |
| DE | 202004020457 U1 | 6/2005 |
| DE | 202005010622 U1 | 11/2006 |
| DE | 102005053821 A1 | 5/2007 |
| DE | 102005053821 B4 | 7/2007 |
| DE | 102006046801 A1 | 4/2008 |
| DE | 202008012687 U1 | 12/2008 |
| DE | 102010041278 A1 | 3/2012 |
| DE | 102011050393 A1 | 11/2012 |
| DE | 102011089499 A1 | 6/2013 |
| DE | 102012105483 A1 | 12/2013 |
| DE | 202014006084 U1 | 8/2014 |
| DE | 102015226734 A1 | 6/2017 |
| DE | 102016211937 A1 | 1/2018 |
| EP | 1270150 A2 | 1/2003 |
| EP | 1291999 A1 | 3/2003 |
| EP | 1690648 A2 | 8/2006 |
| EP | 1781074 A2 | 5/2007 |
| EP | 2072192 A1 | 6/2009 |
| EP | 2581168 A1 | 4/2013 |
| EP | 2628427 A2 | 8/2013 |
| EP | 3200313 A1 | 6/2017 |
| EP | 3272467 A1 | 1/2018 |
| JP | 2010194662 A | 9/2010 |
| KR | 1020180108895 A | 10/2018 |
| WO | WO 2007/058596 A1 | 5/2007 |
| WO | WO 2012/035815 A1 | 3/2012 |
| WO | WO 2012/035854 A1 | 3/2012 |
| WO | WO 2013/014914 A2 | 1/2013 |
| WO | 2013112469 A1 | 8/2013 |
| WO | WO 2013/116303 A1 | 8/2013 |
| WO | WO 2013/136917 A1 | 9/2013 |
| WO | WO 2015/061370 A1 | 4/2015 |
| WO | WO 2016/206859 A1 | 12/2016 |
| WO | WO 2016/206860 A1 | 12/2016 |
| WO | WO 2017/089100 A1 | 6/2017 |
| WO | WO 2017/089452 A1 | 6/2017 |
| WO | WO 2017/093160 A1 | 6/2017 |
| WO | 2017151954 A1 | 9/2017 |
| WO | 2018024637 A1 | 2/2018 |
| WO | 2018162233 A1 | 9/2018 |
| WO | WO 2018/177669 A1 | 10/2018 |

(56) References Cited

FOREIGN PATENT DOCUMENTS

| | | |
|---|---|---|
| WO | WO 2018/177671 A1 | 10/2018 |
| WO | 2019115434 A1 | 6/2019 |

OTHER PUBLICATIONS

International Search Report and Written Opinion for Application No. PCT/US2020/016752 dated Jun. 5, 2020 (13 pages).
International Preliminary Report on Patentability for Application No. PCT/US2018/045500 dated Feb. 11, 2020 (13 pages).
United States Patent Office Non Final Office Action for U.S. Appl. No. 16/684,455 dated Mar. 23, 2020 (9 pages).
International Search Report and Written Opinion for Application No. PCT/US2018/062803 dated Mar. 19, 2019, 12 pages.
International Search Report and Written Opinion for Application No. PCT/US2018/045500 dated Dec. 6, 2018, 15 pages.
Pixie 2.0 User Guide, 6 pages, accessed Jan. 31, 2019.
Pixie, <https://getpixie.com> webpage accessed Jan. 31, 2019.

* cited by examiner

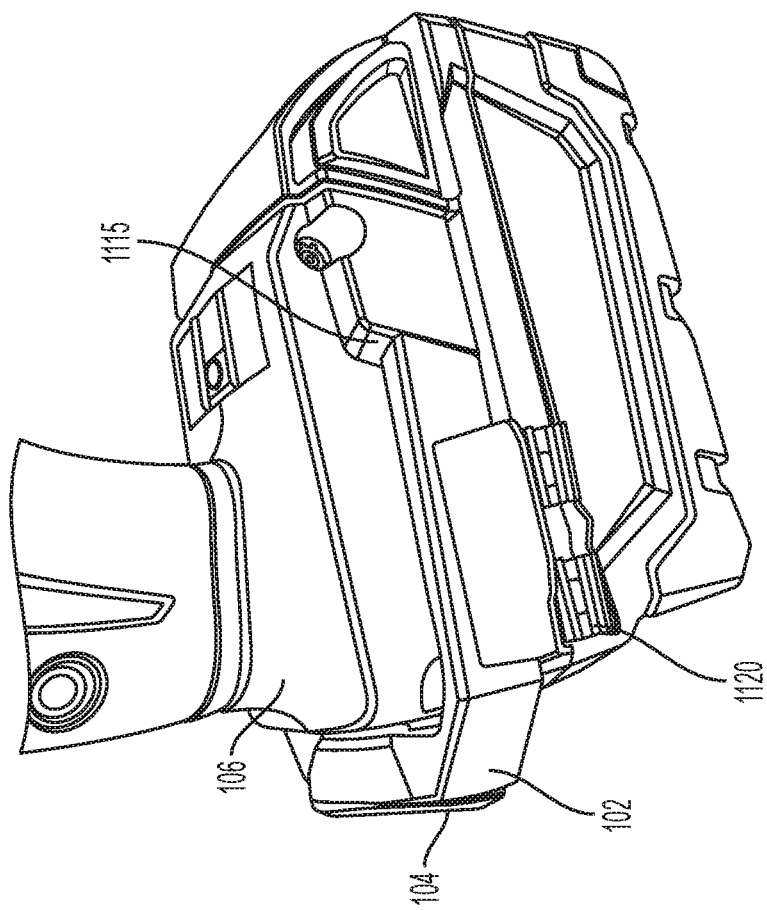

EXTERNALLY ATTACHABLE TRACKING MODULE FOR A POWER TOOL

RELATED APPLICATIONS

This application claims priority to and claims the benefit of U.S. Provisional Patent Application No. 62/592,181, filed Nov. 29, 2017, which is incorporated by reference herein in its entirety.

FIELD OF THE INVENTION

The present invention relates to tracking devices for communication and locating tools and other devices.

SUMMARY

In one embodiment, a power tool tracking clip is provided. The power tool tracking clip includes a wireless beacon transmitter that includes a memory storing an identifier and a transmitter configured to wirelessly transmit the identifier, a clip body that has a beacon receptacle, the wireless beacon transmitter positioned within the beacon receptacle. A first arm member is coupled to a first end of the clip body and has a first inner surface configured to engage a power tool. A second arm member coupled to a second end of the clip body has a second inner surface configured to engage the power tool. A mounting feature on the first arm member aligns with a corresponding mounting feature on a corresponding outer wall of the power tool when the power tool tracking clip is mated to the power tool. In some embodiments the second arm member includes a second mounting feature that aligns with a corresponding mounting feature on an outer wall of the power tool when the power tool tracking clip is mated to the power tool.

In some embodiments, the first arm member and second arm member define an opening, or power tool receiving portion, to receive the power tool. In some embodiments, the opening has a u-shape. In some embodiments, a belt clip accessory is received by the first arm member or the second arm member for fastening the belt clip accessory and the power tool tracking clip to the power tool. In some embodiments, a bit clip accessory is received by the first arm member or the second arm member for fastening the bit clip accessory and the power tool tracking clip to the power tool.

In some embodiments the mounting feature on the first arm member includes a screw hole that aligns with a screw hole on the corresponding mounting feature of the power tool for fastening the power tool tracking clip to the power tool. The first arm member and the second arm member may be flexible and inwardly biased to grip the power tool. In some embodiments the wireless beacon transmitter repeatedly transmits a first beacon signal and subsequently transmits a second advertising beacon signal comprising the identifier.

In another embodiment, a method is provided for tracking a power tool. The method includes receiving a power tool by a power tool tracking clip having a clip body. A wireless beacon transmitter is received in a beacon receptacle of the clip body. An identifier is stored in a memory of the wireless beacon transmitter and is wirelessly transmitted to an external device. The power tool tracking clip includes a first arm member coupled to a first end of the clip body. The first arm member has a first inner surface configured to engage the power tool. The power tool tracking clip includes a second arm member coupled to a second end of the clip body. The second arm member has a second inner surface configured to engage the power tool. A mounting feature on the first arm member aligns with a corresponding mounting feature on an outer wall of the power tool when the power tool tracking clip is mated to the power tool.

In some embodiments of the method, receiving of the power tool in the power tool tracking clip includes receiving the power tool in an opening of a receiving portion of the power tool tracking clip defined by the first arm member and the second arm member. In some embodiments, receiving of the power tool in the power tool tracking clip includes receiving a fastener by a screw hole of the mounting feature on the first arm member and by an aligned screw hole on the corresponding mounting feature of the power tool. In some embodiments, the method further includes receiving, by at least one selected from the group of the first arm member and the second arm member, at least one selected from the group of a belt clip accessory and a bit clip accessory. In some embodiments, receiving of the power tool in the power tool tracking clip includes gripping the power tool by the first arm member and the second arm member, wherein the first arm member and the second arm member are flexible and inwardly biased to grip the power tool. In some embodiments, the method further includes separating, by the power tool tracking clip, from the power tool; receiving a tracked object other than the power tool in an opening of a receiving portion of the power tool tracking clip defined by the first arm member and the second arm member; and wirelessly transmitting the identifier to the external device after the tracked object is received by the power tool tracking clip.

In some embodiments a system is provided for tracking a power tool. The system includes a power tool including a mounting feature and a power tool tracking clip secured to the power tool. The power tool tracking clip includes a wireless beacon transmitter, a clip body, a first arm member, and a second arm member. The wireless beacon transmitter includes a memory storing an identifier and a transmitter configured to wirelessly transmit the identifier. The first arm member is coupled to a first end of the clip body and has a first inner surface engaged with the power tool. The second arm member is coupled to a second end of the clip body and has a second inner surface engaged to the power tool. The power tool tracking clip further includes a corresponding mounting feature on the first arm member, the corresponding mounting feature aligning with the mounting feature of the power tool when the power tool tracking clip is mated to the power tool.

In some embodiments of the system, the system includes an external wireless device configured to receive the identifier from the wireless beacon transmitter of the power tool tracking clip, determine a geographical location, and transmit the identifier and the geographical location to a server. In some embodiments, the system includes a second external wireless device is configured to receive the identifier from the wireless beacon transmitter of the power tool tracking clip, determine a geographical location of the second external wireless device, and transmit the identifier and the geographical location of the second external wireless device to the server.

Other aspects of the invention will become apparent by consideration of the detailed description and accompanying drawings.

BRIEF DESCRIPTION OF THE DRAWINGS

FIGS. 11A, 11B, and 11C illustrate three examples of a power tool tracking clip attached to a power tool with various accessories added, according to some embodiments.

DETAILED DESCRIPTION

Figure 1:
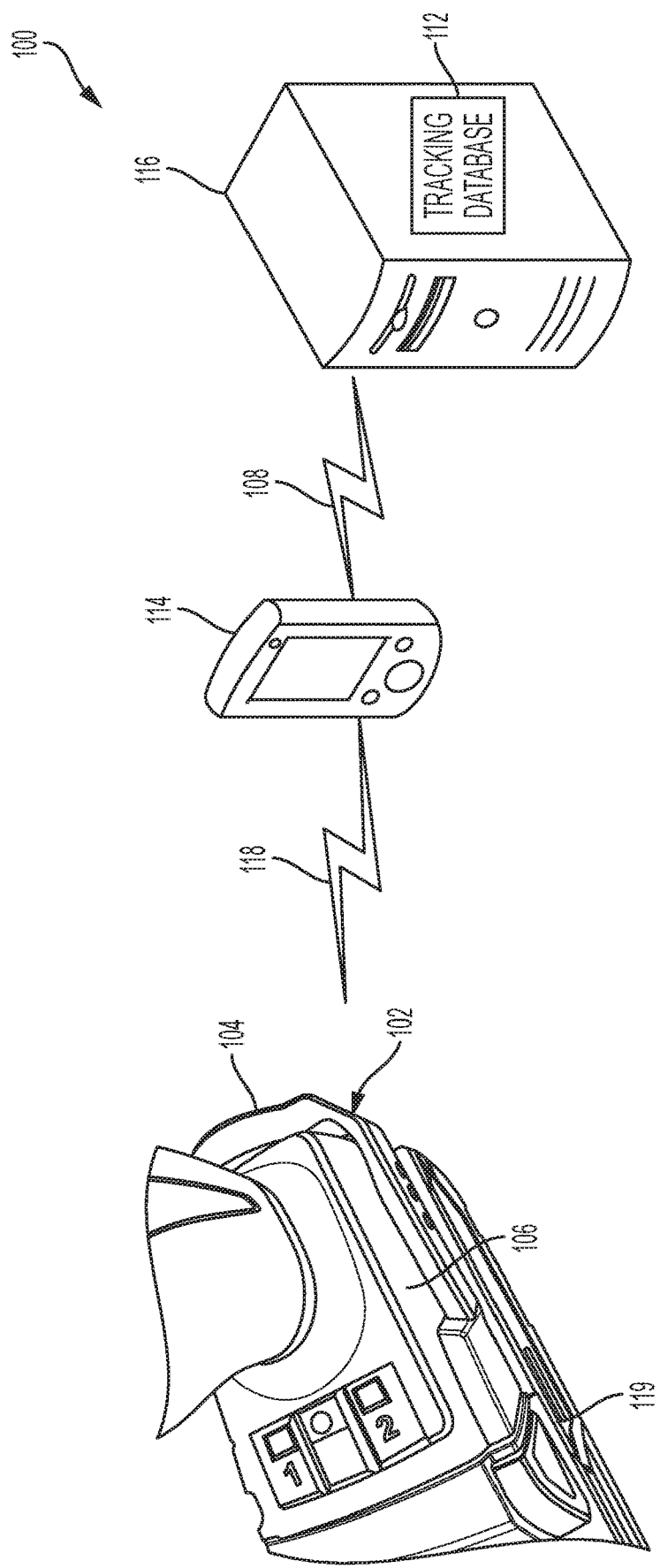
FIG. 1 illustrates a communication system for tracking a power tool using a power tool tracking clip, according to some embodiments.
Figure 2:
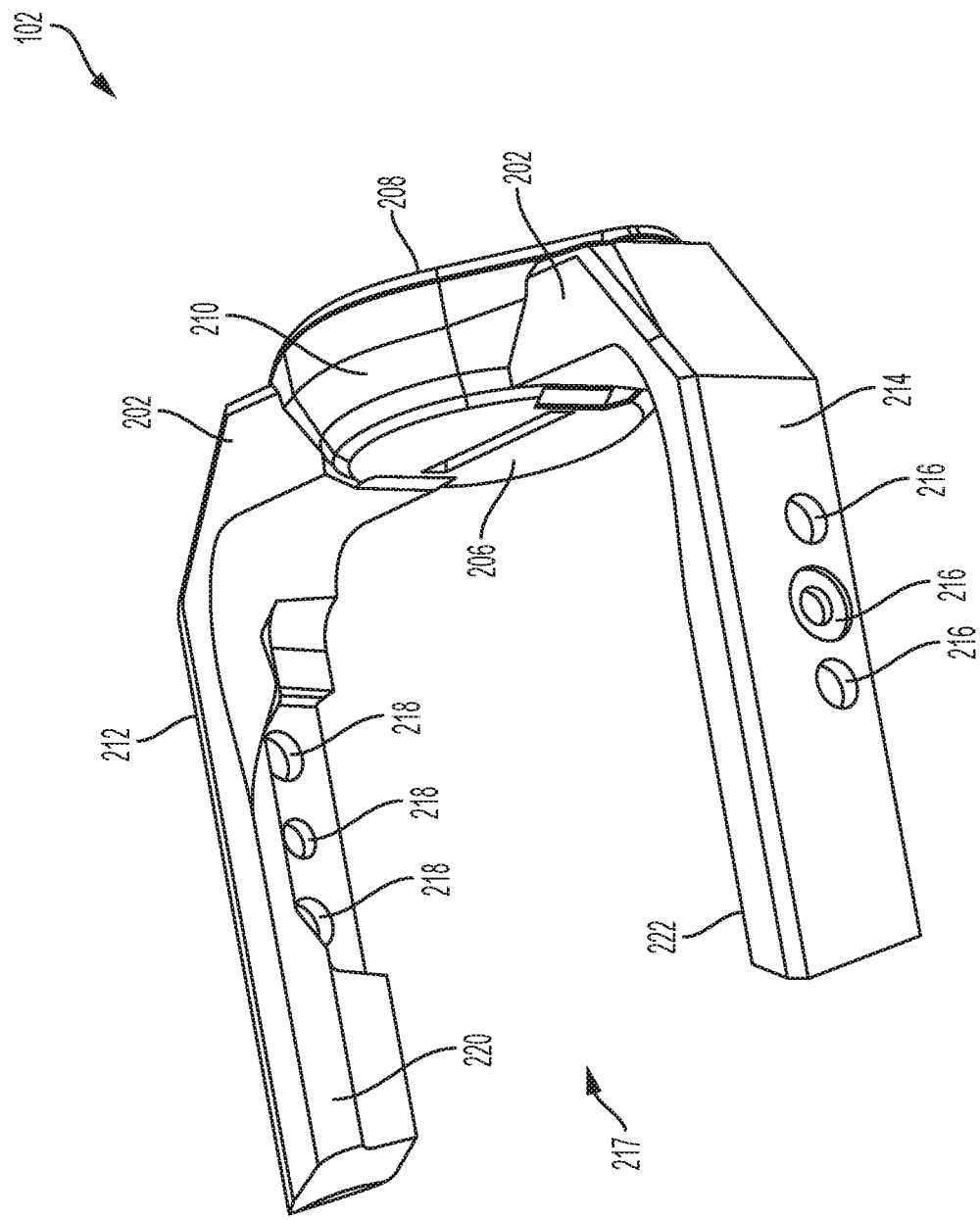
FIGS. 2-6 illustrate various views of a power tool tracking clip including a wireless beacon transmitter, according to some embodiments.
Figure 3:
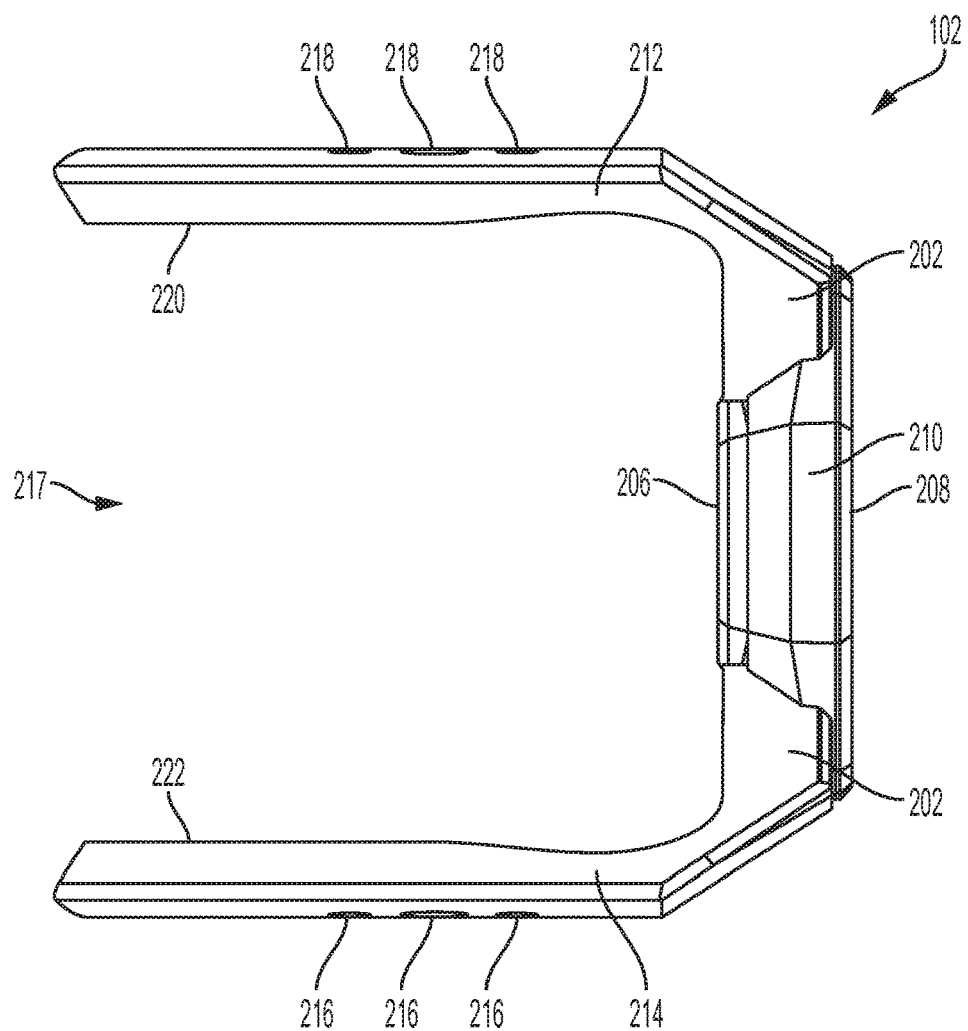
Figure 4:
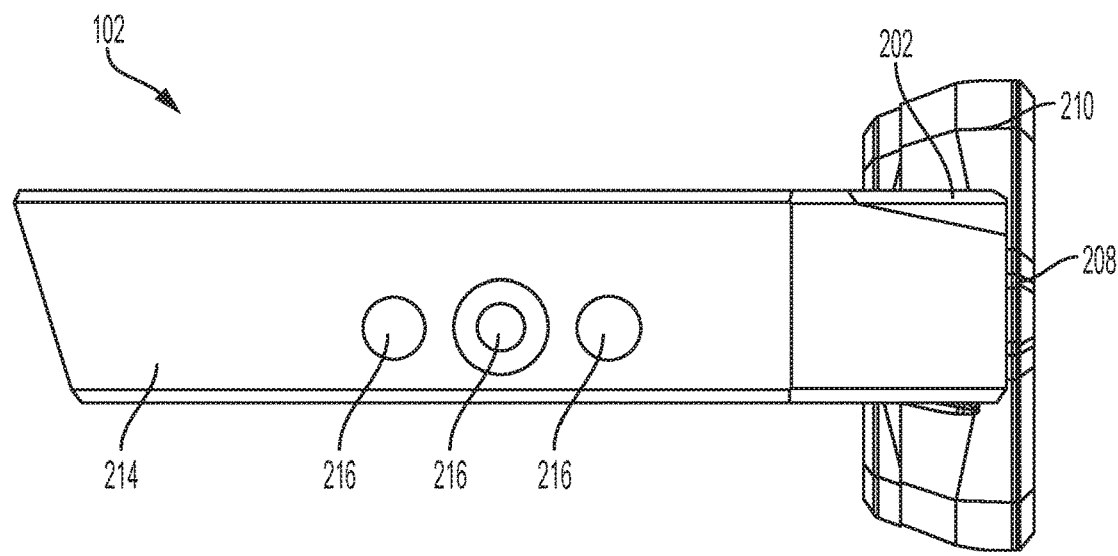
Figure 5:
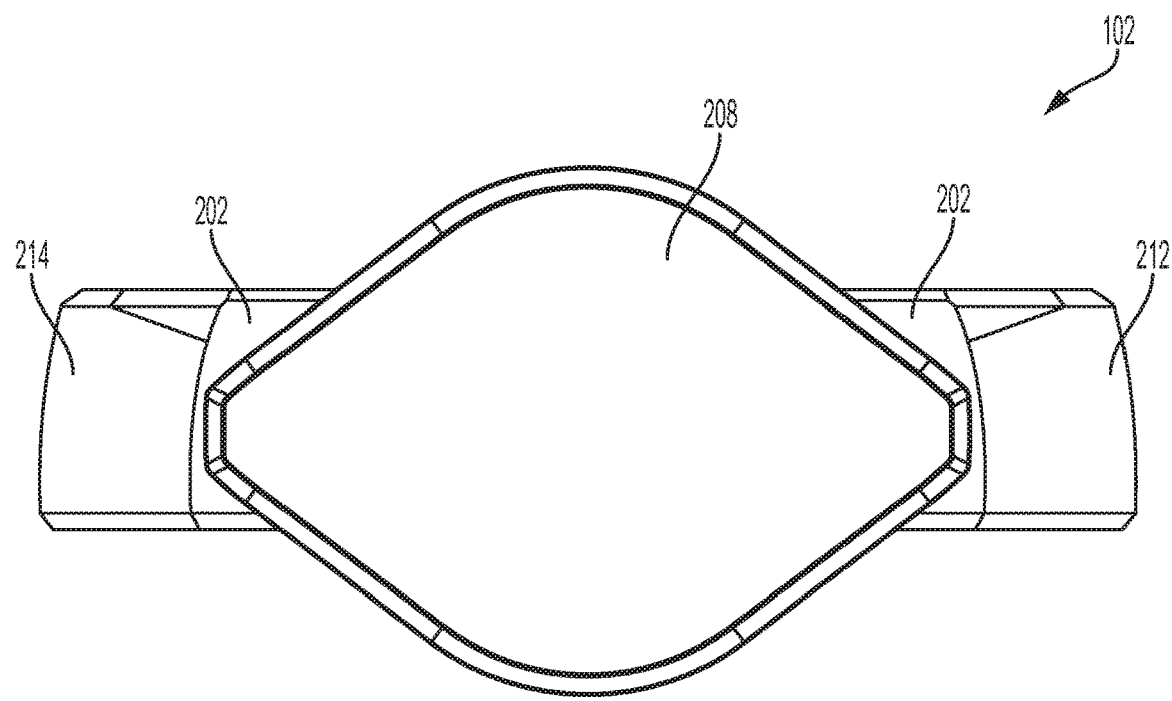

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

It should also be noted that a plurality of hardware and software based devices, as well as a plurality of different structural components, may be used to implement the embodiments. In addition, it should be understood that embodiments of the disclosure may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the disclosure may be implemented in software (e.g., stored on non-transitory computer-readable medium) executable by one or more electronic processors. As such, it should be noted that a plurality of hardware and software based devices, as well as a plurality of different structural components may be utilized to implement the embodiments. Furthermore, and as described in subsequent paragraphs, the specific mechanical configurations illustrated in the drawings are intended to exemplify embodiments of the disclosure and that other alternative mechanical configurations are possible. For example, "controllers" described in the specification can include processing components, such as one or more processors, one or more computer-readable medium modules, one or more input/output interfaces, and various connections (e.g., a system bus) connecting the components. In some instances, the controllers described in the specification may be implemented in one of or a combination of a microprocessor, an application specific integrated circuit (ASIC), a digital signal processor (DSP), a field programmable gate array (FPGA), or the like.

FIG. 1 depicts a power tool tracking system 100 that includes a power tool tracking clip 102, a power tool 106, a personal wireless device 114, a location server 116, and a tracking database 112.

The power tool tracking clip 102 includes a wireless beacon transmitter 104 that is a communication device that includes a transmitter and communicates via wireless signals 118 (e.g., Bluetooth™ low energy transmissions) with a personal wireless device 114 configured to receive such signals. However, the wireless beacon transmitter 104 is not limited in this regard, and may be configured to communicate via a network with the personal wireless device 114 utilizing other suitable wireless technology supported by the personal wireless device 114. The wireless beacon transmitter 104 may be referred to as a beacon transmitter. The personal wireless device 114 (also referred to as a receiving device) may be, for example, a mobile smart phone, laptop computer, desktop computer, personal digital assistant (PDA), or other receiving device. Personal wireless device 114 communicates via a network 108 with the location server 116. The network 108 may include one more of a local area network (LAN), wide area network (WAN) (e.g., the Internet), a cellular network, or other networks.

As described in further detail below, the wireless beacon transmitter 104 may transmit a wireless signal 118 and the personal wireless device 114 may receive the wireless signal 118. The signal 118 may include beacon data from the wireless beacon transmitter 104. The beacon data may include one or more of a transmitter identifier, a user identifier, user contact information, timestamp, state of charge of a battery (110, shown in FIG. 10), an object identifier (identifying the power tool 106 or the wireless beacon transmitter 104), a location of the wireless beacon transmitter 104, performance information and/or other status information. In turn, the personal wireless device 114 (a) logs the beacon data locally on a memory of the personal wireless device 114, (b) sends tracking data, based on the beacon data, to the location server 116 for logging (e.g., all or a portion of the beacon data), or (c) both logs the beacon data and sends the tracking data. The personal wireless device 114 may also measure characteristics of the signal 118, for example, received signal strength. In some embodiments, the wireless beacon transmitter 104 includes a wireless receiver and receives signals from the personal wireless device 114 or other wireless devices. For example, the wireless beacon transmitter 104 may receive software downloads, configuration parameters, requests for location data, requests for beacon signals, and the like.

The location server 116 includes a tracking database 112. A tracking application may be executed by an electronic processor of the location server 116. The tracking application receives tracking data from the personal wireless device 114, updates the tracking database 112, and receives and responds to database queries for the tracking database 112. The tracking database 112 stores tracking data for the beacon transmitter 104 including one or more of a transmitter identifier, a user identifier (e.g., an owner or user of the beacon transmitter 104), user contact information, timestamp, last known location, state of charge of the battery 110, other status information, personal wireless device identifier (e.g., identifying the most recent personal wireless device 114 that received communications from the beacon transmitter 104 and communicated to the location server 116), and location history (e.g., including previous known locations, timestamps, and personal wireless device identifiers). The tracking database 112 also stores a lost/not-lost indication (e.g., a flag) that indicates, based on a value of the indicator, whether the beacon transmitter 104 is considered "lost" or "not lost."

Although a single beacon transmitter 104 is illustrated in FIG. 1, in some embodiments, the system 100 includes a plurality of beacon transmitters 104, each used to track a different object or tool. Similarly, although a single personal wireless device 114 is illustrated in FIG. 1, in some embodiments, the system 100 includes a plurality of personal wireless devices 114 that may each receive wireless signals 118 from the wireless beacon transmitter 104 or additional wireless beacon transmitters, and that may each communicate with the location server 116 over the network 108 or another network. Accordingly, the tracking database 112 stores and updates tracking data for each beacon transmitter 104 in the system 100 based on communications from the one or more personal wireless devices 114.

Although the location server 116 is illustrated as a singular unit, the location server 116 may be made up of various servers located together or remotely and coupled via one or more networks. Similarly, the tracking database 112 may be made up of various databases in communication with one another. In some embodiments, in instances when the system 100 includes a plurality of personal wireless devices 114 that each receive a wireless beacon signal from the wireless beacon transmitter 104, and forward signal information to the location server 116, the location server 116 may determine a location of the power tool 106 based on multiple reference points provided by the plurality of personal wireless devices 114.

The illustrated power tool 106 is a drill powered by a removable battery pack 119. Although the power tool 106 is illustrated in FIG. 1, the power tool tracking clip 102 including the beacon transmitter 104 may be mounted on and track various other objects including other types of tools and accessories. For example, the power tool tracking clip 102 including the beacon transmitter 104 may be mounted on and used with hand tools, power tools, test and measurement equipment, battery packs, vacuum cleaners, work site radios, outdoor power equipment, ladders, toolboxes, job boxes, and vehicles. Other tools on which versions of the power tool tracking clip 102 including the beacon transmitter 104 may be mounted include drills, circular saws, jig saws, band saws, reciprocating saws, screw drivers, angle grinders, straight grinders, hammers, multi-tools, impact wrenches, rotary hammers, impact drivers, angle drills, pipe cutters, grease guns, and the like. Test and measurement equipment can include digital multimeters, clamp meters, fork meters, wall scanners, IR thermometers, laser distance meters, laser levels, remote displays, insulation testers, moisture meters, thermal imagers, inspection cameras, and the like. Vacuum cleaners can include stick vacuums, hand vacuums, upright vacuums, carpet cleaners, hard surface cleaners, canister vacuums, broom vacuums, and the like. Outdoor power equipment can include blowers, chain saws, edgers, hedge trimmers, lawn mowers, trimmers, and the like. Other tools on which versions of the power tool tracking clip 102 including the beacon transmitter 104 may be mounted include devices such as electronic key boxes, calculators, cellular phones, head phones, cameras, motion sensing alarms, flashlights, work lights, weather information display devices, a portable power source, a digital camera, a digital music player, a radio, and multi-purpose cutters. Any of the various other objects that the power tool tracking clip 102 including the beacon transmitter 104 is attached to may be referred to as a tracked object.

In operation, the power tool 106 may be received and secured by a power tool tracking clip 102 that includes the wireless beacon transmitter 104. The wireless beacon transmitter 104 may store an identifier and may wirelessly transmit the identifier to the personal wireless device 114 via the wireless communication link 118. In some embodiments, when the personal wireless device 114 receives a signal from the wireless beacon transmitter 104, the personal wireless device 114 may determine that the wireless beacon transmitter 104 and/or an attached power tool 106, are within a limited distance from the personal wireless device 114 according to a known range for wireless communication used by the wireless beacon transmitter 104, for example, Bluetooth™ low energy transmissions.

In some embodiments, the personal wireless device 114 may be operable to determine a location or proximity of the wireless beacon transmitter 104 relative to the wireless personal device 114 based on characteristics of a received signal from the wireless beacon transmitter 104. In some embodiments, the personal wireless device 114 may execute an application that presents information about the location or proximity of the wireless beacon transmitter 104, for example, in display, or with an audible alert to a user. In some embodiments, the wireless personal device may communicate information received from the wireless beacon transmitter 104 to the server 116 for location determination or for location tracking of the wireless beacon transmitter 104.

FIGS. 2-6 illustrate various views of a power tool tracking clip including a wireless beacon transmitter according to some embodiments. More particularly, FIGS. 2-6 illustrate the power tool tracking clip 102. The power tool tracking clip 102 has a clip body 202. The clip body 202 includes a beacon receptacle 210 for receiving the wireless beacon transmitter 104. The wireless beacon transmitter 104 is positioned within the beacon receptacle 210. A first arm member 212 is coupled to a first end of the clip body 202. The first arm member has a first inner surface 220 that is configured to engage the power tool 106. A second arm member 214 is coupled to a second end of the clip body 202 and has a second inner surface 222 that is configured to engage the power tool 106.

In some embodiments, the first arm member 212 and the second arm member 214 of the power tool tracking clip 102 define an opening 217 to receive the power tool. The opening 217, also referred to as a power tool receiving portion, may form a u-shape. Although the shape of the opening 217 is shown in FIGS. 2-6 as having a u-shape, the power tool tracking clip 102 may be formed in other suitable shapes such that the power tool tracking clip 102 including the wireless beacon transmitter 104 may receive and attach to other suitable types or shapes of power tools or other objects.

Figure 11B:
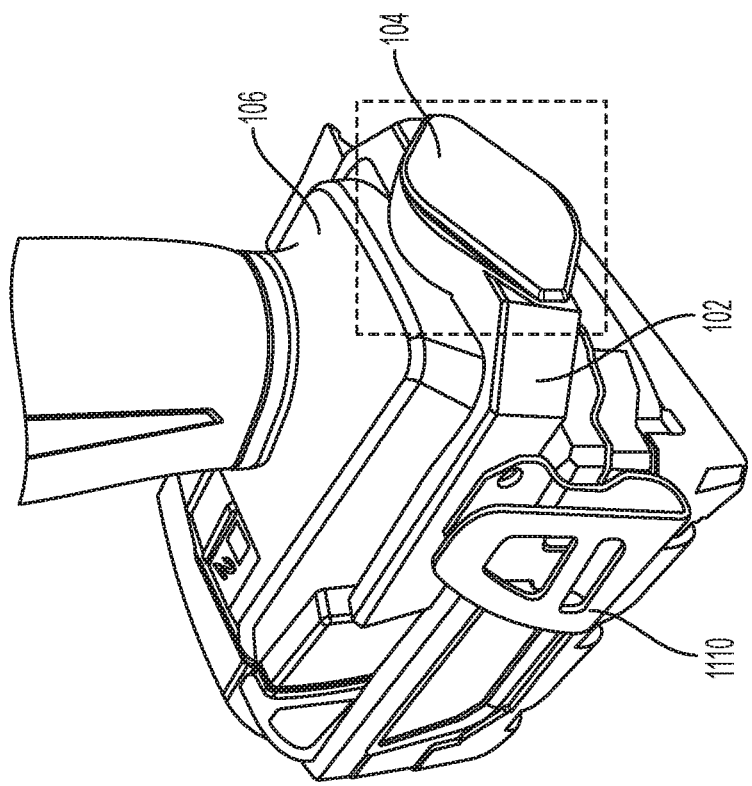

The first arm member 212 may include a mounting feature 218. The second arm member 214 may include a second mounting feature 216. The mounting features 216 and 218 may align with corresponding accessory mounting features 1100 (see FIGS. 11D-E) on corresponding outer walls of the power tool 106 when the power tool tracking clip 102 is mated to the power tool 106, as shown in FIG. 1. For example, the power tool 106 may have mounting features 1100 on multiple sides of the power tool. In some embodiments, the mounting features 216 and 218 include screw holes that align with corresponding screw holes on the accessory mounting features 1100 of the power tool 106. For example, the power tool 106 may include holes in the accessory mounting features 1100 for the power tool tracking clip 102 or for various accessories, such as a power tool belt clip or power tool bit clip for storing drill bits. In some embodiments, the accessory mounting holes 1100 on the power tool 106 may be utilized for mounting the power tool tracking clip 102 or both of the power tool tracking clip 102 and another accessory. For example, FIG. 11B illustrates a belt clip 1110 and a power tool tracking clip 102 mounted using the same accessory mounting screw holes on the power tool 106 and the same screws to fasten the belt clip and the power tool tracking clip 102 to the power tool 106. Similarly, FIG. 11C illustrates a bit clip 1120 and a power tool tracking clip 102 fastened using the same power tool accessory mounting screw holes on the power tool 106.

Figure 7:
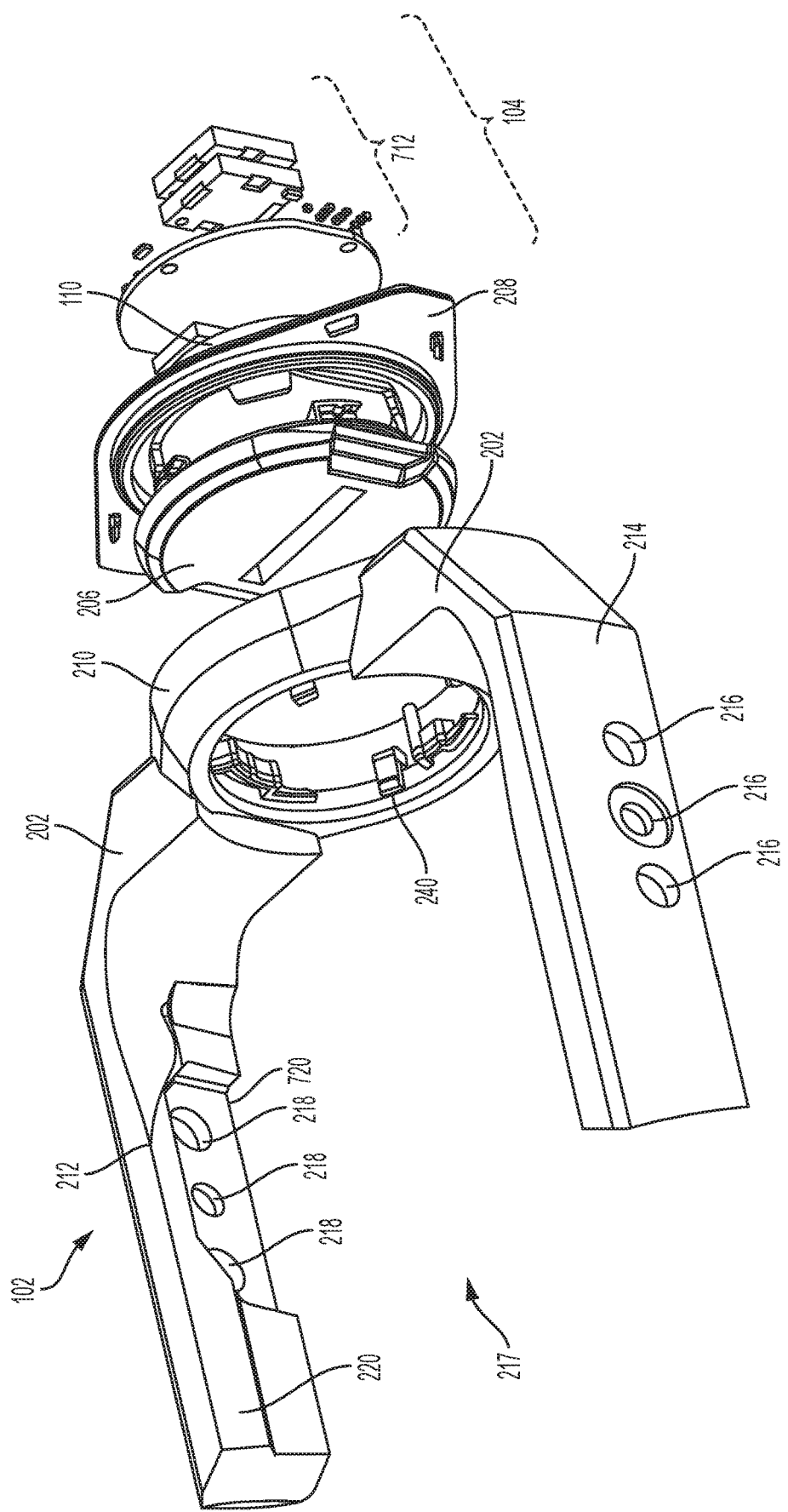
FIG. 7 illustrates an expanded view of a power tool clip including a wireless beacon transmitter, according to some embodiments.

The mounting features 216 and 218 may be located in recesses 720 of the first and second arm members 212, 214. For example, FIG. 7 illustrates the mounting features 218 located within the recess 720 of the first arm member 212. A similar recess (not shown) is provided on the second arm member 214. The recesses 720 (FIG. 7) are shaped to receive, conform to, or both, the projection portion 1105 of the accessory mounting features 1100 (see FIGS. 11D-E). Additionally, as illustrated in FIGS. 11A-E, the power tool 106 includes abutments 1115 to which free ends of the first and second arm members 212, 214 abut.

In some embodiments, other suitable mounting features may be utilized for securing the power tool tracking clip 102 to a power tool 106 or to another device. For example, the mounting features 216 and 218 may include an adhesive, hook and loop fasteners, or the like, rather than securing the power tool tracking clip 102 using fasteners through the mounting holes. Additionally, in some embodiments, the first and second arm members 212, 214 are flexible and angled inward such that the opening 217 is defined more narrowly than the portion of the power tool 106 that is received in the opening 217. The first and second arm members 212, 214 are flexed outward to receive the power tool 106 in the opening 217, and then the first and second arm members 212, 214, which are inwardly biased, grip the power tool 106. In some embodiments, the first and second arm members 212, 214 may still include the mounting features 216 and 218 to receive tool accessories, such as the belt clip or bit clip.

The power tool tracking clip 102 includes the receptacle 210 for receiving the wireless beacon transmitter 104. As described below, the wireless beacon transmitter 104 may be situated within the receptacle 210 between a back cover 206 and a front cover 208. The front and back covers 206 and 208 may secure the wireless beacon transmitter 104 within the receptacle 210, and may protect the wireless beacon transmitter 104 from being damaged during use of the power tool or upon impact.

The power tool tracking clip 102 may be a single molded object or may be assembled from multiple parts. The power tool tracking clip 102 may be made of durable plastic or metal materials.

FIG. 7 illustrates an expanded view of a power tool tracking clip including a wireless beacon transmitter according to some embodiments. More particularly, the front cover 208 and back cover 206 are shown expanded away from the receptacle 210 for illustrative purposes. In the expanded view, the elements of FIG. 7 are not shown in order of assembly. For example, the back cover 206 is shown in front of the receptacle 210, and internal elements are shown in front of the front cover 208. The wireless beacon transmitter 104 (described further with respect to FIG. 10) includes a printed circuit board 712 comprising electronics for the wireless beacon transmitter 104 and a power source 110, for example, a coin cell battery 110. When the power tool tracking clip 102 is assembled, in some embodiments, the coin cell battery 110 may be connected to the printed circuit board 712 and mechanically attached to the back cover 206. The coin cell battery 110 and the printed circuit board 712 may be received by the receptacle 210. In some embodiments, the coin cell battery 110 is releasably attached to the back cover 206 such that removal of the back cover 206 removes the coin cell battery 110 (e.g., for replacement). However, the disclosure is not limited in this regard, and in some embodiments, the coin cell battery 110 may not be replaceable or serviceable by a user. For example, the back cover 206 may be permanently attached (e.g., via adhesive or interlocking tabs) to prevent removal thereof. The front cover 208 is attached to a front side of the body 202 using, for example, a snap-in connection. The front cover 208 covers the printed circuit board 712.

Figure 8:
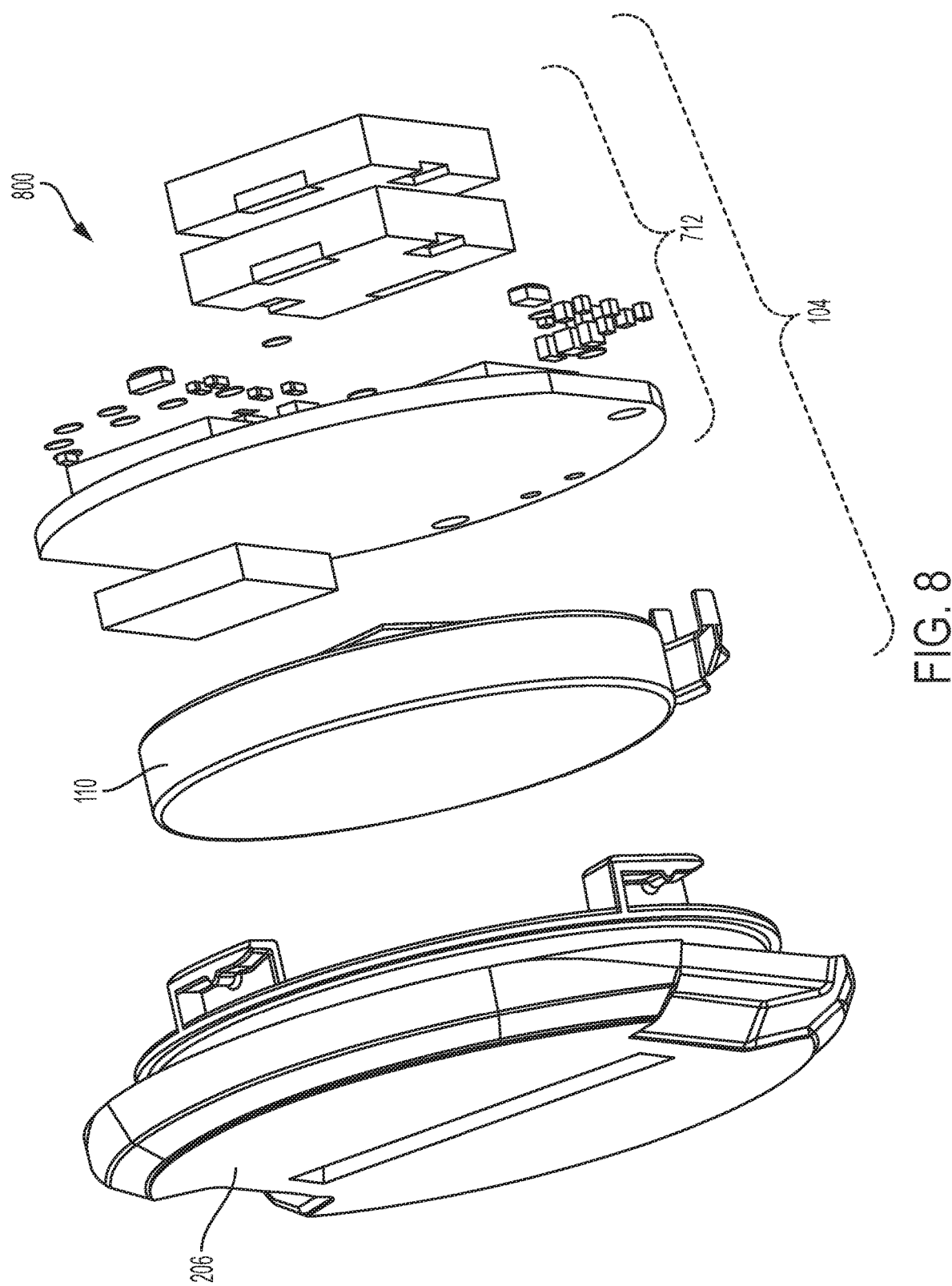
FIG. 8 illustrates an expanded view of a wireless beacon transmitter, according to some embodiments.

FIG. 8 illustrates an expanded view 800 of the back cover 206, the coin cell battery 110, and the printed circuit board 712. With reference to FIGS. 7-8, the power tool tracking clip 102 includes, when assembled, from back to front, the back cover 206, the coin cell 110, the printed circuit board 712, and the front cover 208.

Figure 6:
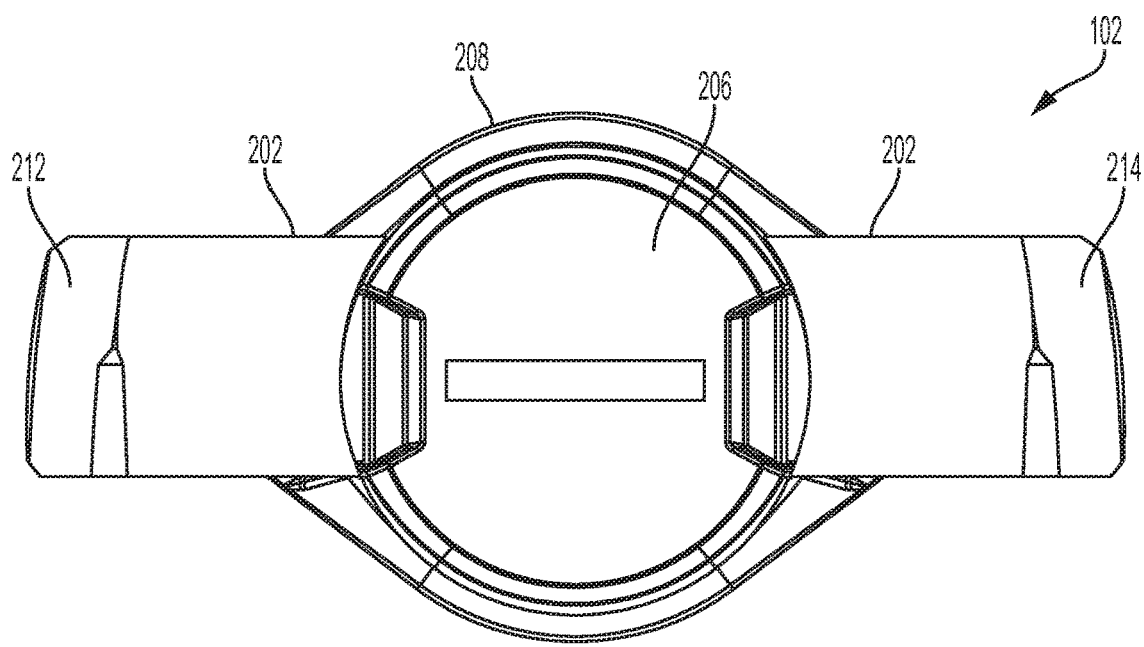
Figure 9B:
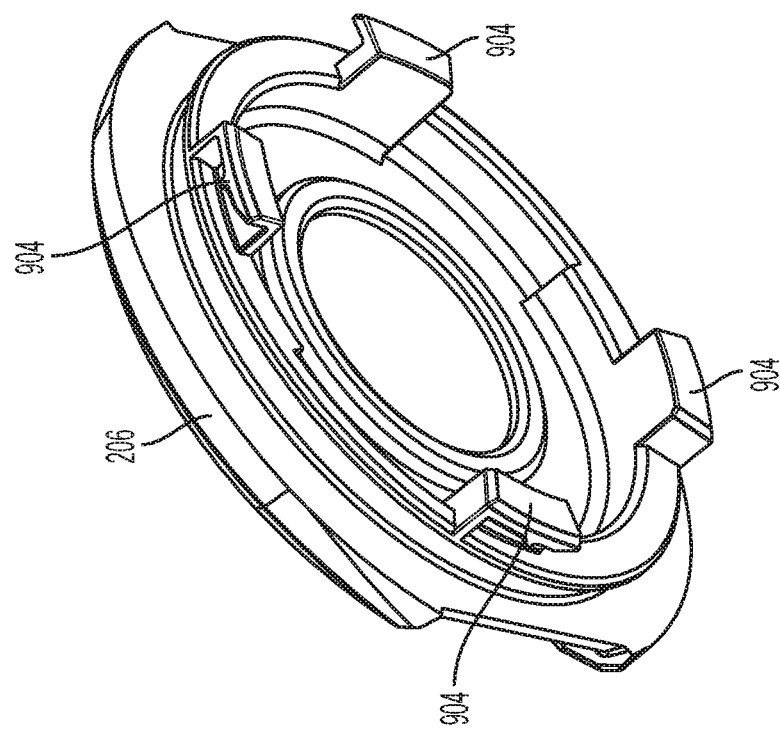
FIGS. 9A-9B depict two views of a wireless beacon transmitter cover, according to some embodiments.
Figure 9A:
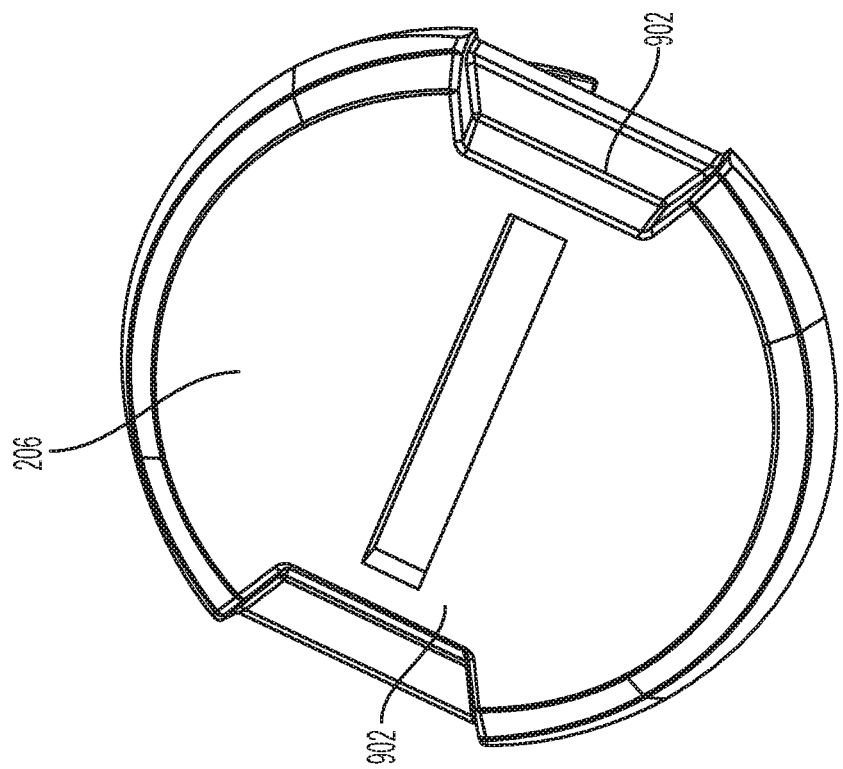

FIGS. 9A-9B illustrate two views of a wireless beacon transmitter cover according to some embodiments. FIG. 9A includes a view of the back cover 206 that is attached to the interior side of the body 202 of the power tool tracking clip 102 as shown in FIG. 6. The back cover 206 may include one or more handle members 902 that may extend from the back cover 206. The handle members 902 may enable a user to disengage the back cover 902 from the power tool tracking clip 102 with a screwing action, or an inward or outer pressure action to remove the back cover 206. For example, the back cover 902 may be removed to change the coin battery cell 110.

FIG. 9B includes a view of the back cover 206 that includes an interior side of the back cover 206 relative to the power tool tracking clip receptacle 210. The interior side of the back cover 206 includes latching groove members 904 that are configured to connect to corresponding latching bracket members 240 within the receptacle 210 to secure the back cover 206 to the receptacle 210. The latching groove members 904 and latching bracket members 240 form a bayonet mount connection. For example, the back cover 206 may be rotated in an appropriate direction to remove, or replace and secure the back cover 206 to the power tool tracking clip 102.

Although, FIGS. 7, 8, 9A, and 9B depict the elements of the wireless beacon transmitter 104 and the covers 206 and 208 in a specified order and with particular design elements, the disclosure is not limited in this regard, and other suitable assemblies and designs of the wireless beacon transmitter 104 integrated into the power tool tracking clip 102 may be utilized.

Figure 10:
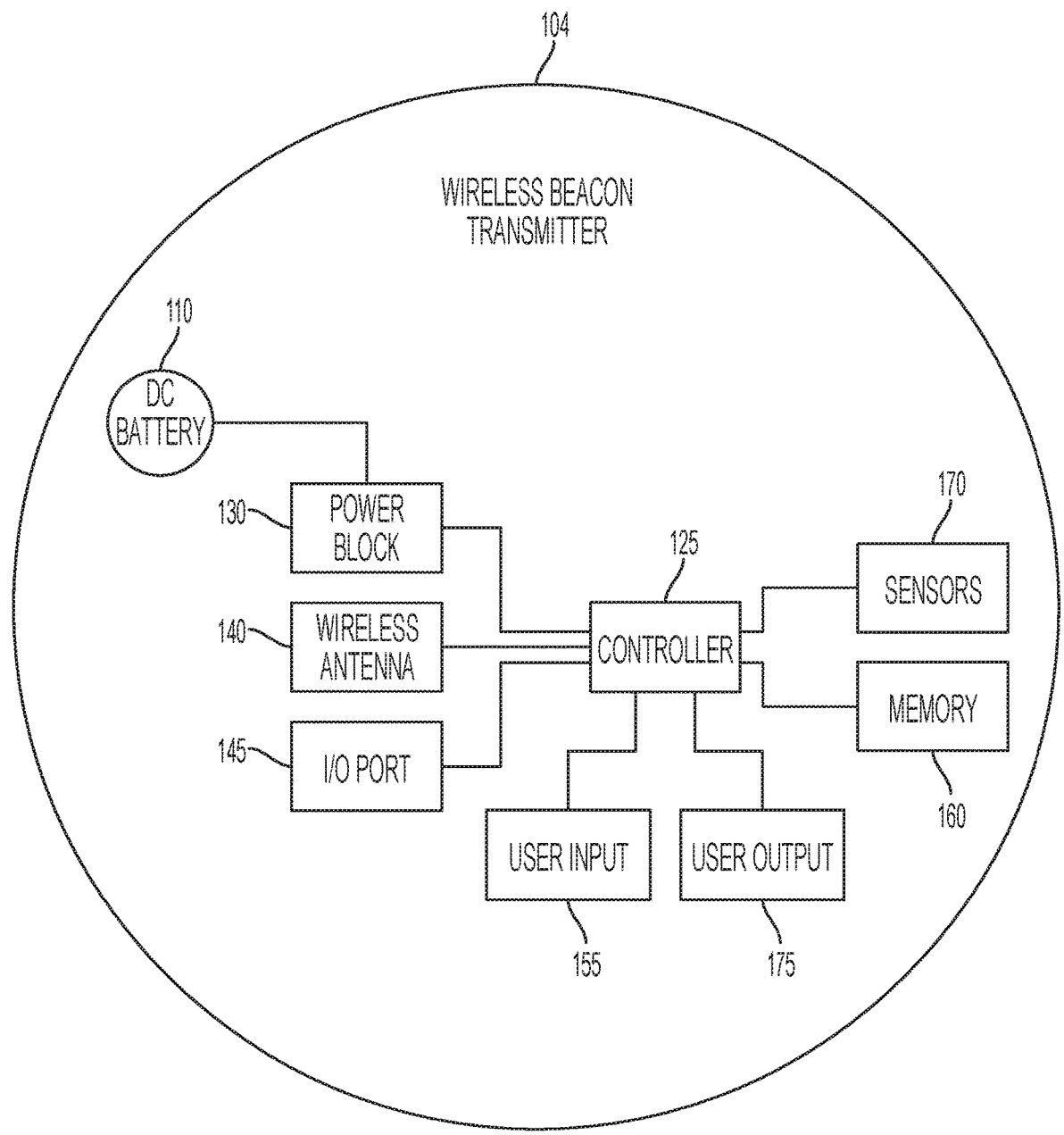
FIG. 10 is a block diagram of a wireless beacon transmitter, according to some embodiments.

FIG. 10 is a block diagram of a wireless beacon transmitter, such as the wireless beacon transmitter 104, for location reporting according to some embodiments. The wireless beacon transmitter 104, also referred to as a transmitting device, includes a battery 110 (also referred to as a power source), a controller 125, a power block 130, a wireless antenna 140 (also referred to as a wireless antenna unit) an input/output (I/O) port 145, a memory 160, user input 155, sensors 170, and user output 175. The wireless antenna unit 140 may include a wireless transmitter. In some embodiments, the wireless antenna unit 140 may also include a wireless receiver. The wireless antenna unit 140 is operable to communicate via wireless signals (e.g., Bluetooth™ low energy transmissions) with a personal wireless device or any suitable communication device. A signal may be transmitted by the wireless beacon transmitter 104 to the personal wireless device 114 via the wireless antenna unit 140. The signal may include information stored in the memory 160, for example, one or more of a transmitter identifier, a user identifier, user contact information, a timestamp, state of charge of the battery 110, an object identifier (e.g., identifying the power tool 106 and/or the wireless beacon transmitter 104), a location of the wireless beacon transmitter 104, performance information and/or other status or parameter information. The signal transmitted via the wireless antenna 140 may indicate the location or proximity of the wireless beacon transmitter 104 and/or the power tool 106. For example, when the personal wireless device 114 receives a signal from the wireless beacon transmitter 104, the wireless device 114 may indicate to a user that the wireless beacon transmitter 104 is within a wireless communication distance from the wireless device 114. In some embodiments, the wireless communication device 114 may be operable to determine a location or proximity of the wireless beacon transmitter 104 based on characteristics of the signal received from the wireless beacon transmitter 104 and may notify a user or the server 116 of the location. In some embodiments, the wireless beacon transmitter 104 may include a Global Navigation Satellite System (GNSS) receiver (not shown) for determining a location of the wireless beacon transmitter 104, and a signal transmitted by the wireless beacon transmitter 104 to the personal wireless device 114 may indicate a location of the wireless beacon transmitter 104 determined by the GNSS receiver. In some embodiments the wireless antenna unit 140 may also include a wireless communication receiver, for example, for receiving and downloading information to the memory 160, which is received from the personal wireless device 114 or another communication or computing device.

In some embodiments, as described in further detail below, the wireless beacon transmitter 104 may repeatedly transmit, via the transmitter and wireless antenna 140, a first beacon signal and a second advertising beacon signal according to a transmission pattern, which, in some embodiments, enables power-efficient location tracking of the wireless beacon transmitter 104 and an object such as the power tool 106 to which it is attached.

The battery 110 provides direct current (DC) power to the power block 130. The battery 110 includes a housing within which is one or more battery cells, such as lithium ion ("Li-ion") cells, Nickel-Cadmium ("Ni-Cad") cells, or cells of another chemistry type. In some embodiments, the battery 110 is a coin cell battery. In some embodiments, the wireless beacon transmitter 104 includes another power source in addition to the battery 110 or in place of the battery 110, such as a circuit for connection to alternating current power (e.g., including a rectifier), photovoltaic cells and related circuitry for solar-based power generation, or a wind-based power generator.

The power block 130 is coupled to the battery 110 via terminals of the battery 110 and matching terminals of the power block 130. The power block 130 provides DC power to components of the wireless beacon transmitter 104. The power block 130 may include power regulating and conversion circuitry to ensure that the power provided to various components of the wireless beacon transmitter 104 is at the appropriate level(s).

The controller 125 is further coupled to the wireless antenna unit 140, and the input/output (I/O) port 145. As will be described in greater detail below, the power block 130, wireless antenna unit 140, and I/O port 145 enable the wireless beacon transmitter 104 to communicate with external devices and may be collectively referred to as a physical interface.

The controller 125, which may be an electronic processor, is in communication with the memory 160. In some embodiments, the memory 160 stores and provides to the controller 125, for transmission, the data making up the first beacon signal and the second advertising beacon signal, which are described in further detail below. The memory 160 further includes, among other elements, instructions that are executed by the controller 125 to control the functions of the wireless beacon transmitter 104 described herein. Although the instructions are described as software stored in memory 160 and executed by the controller 125, the instructions may be implemented in part or wholly in hardware of the controller 125 or outside of the controller 125. For example, the instructions may be implemented by one or more separate digital signal processors (DSPs) or general purpose processors executing the instructions, or by one or more field programmable gate arrays (FPGAs) or application specific integrated circuits (ASICs). Although the memory 160 is shown as a singular unit, the memory 160 may be made up of various memories individually coupled to the controller 125 or coupled to the controller 125 via a bus. Additionally, portions of the memory 160 may be embedded within the controller 125. For instance, parameters such as a status of the battery 110 may be stored within a memory of the controller 125. The data stored in the memory 160 described herein may be provided from an external computing device via the wireless antenna 140 or I/O port 145 and stored in the memory 160 by the controller 125.

The user input 155 and sensors 170 include one or more of buttons, microphones, accelerometers, temperature sensors, humidity sensors, and light sensors capable of detecting external stimuli from the environment or the user. The user output 175 includes one or more of LEDs, a speaker, a vibrating element, etc. to inform the user of the status of the wireless beacon transmitter 104. For example, if an error occurs, such as low battery power, the wireless beacon transmitter 104 may output an audible alert, an LED may flash, and/or the vibrating element may provide tactile feedback to the user. The user output 175 may be controlled by output signals from the controller 125.

The controller 125 is further coupled to the wireless antenna unit 140 and the I/O port 145. As described in further detail below, the controller 125 may transmit wireless communications via the wireless antenna unit 140 and may receive wireless communications via the wireless antenna unit 140. The I/O port 145 may include a wired connection for the wireless beacon transmitter 104 to enable, for example, programming of the wireless beacon transmitter 104 or data export from the wireless beacon transmitter 104.

Figure 11A:
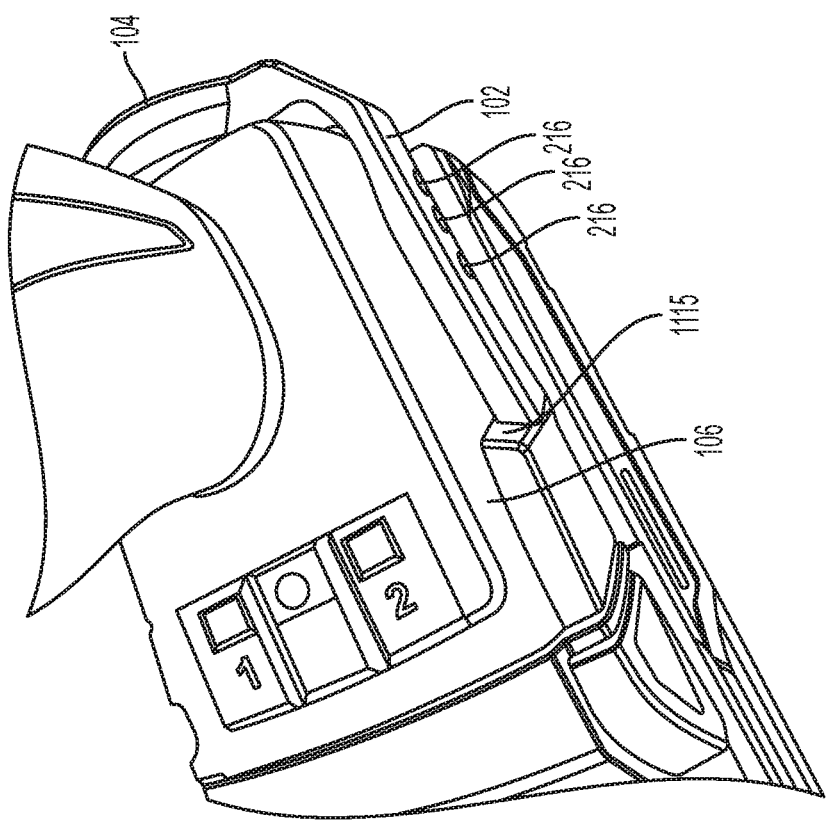

FIGS. 11A, 11B, and 11C illustrate three examples of a power tool tracking clip attached to a power tool including various accessories, according to some embodiments.

As noted above, FIG. 11A depicts the power tool tracking clip 102 fastened directly to the power tool 106. The power tool tracking clip 102 is fastened to the power tool 106 by screws going through mounting features 216 or 218 of the power tool tracking clip 102 and into the accessory mounting features 1100 (see FIGS. 11D-E).

FIG. 11B depicts the power tool tracking clip 102 fastened together with the power tool belt clip 1110 to the power tool 106. In this example, mounting holes of the power tool belt clip 1110 align with the mounting features 216 of the power tool tracking clip 102 and the accessory mounting features 1100 of the power tool 106. Screws are inserted into the mounting holes and mounting features 216 and 1100 to fasten the power tool belt clip 1110 and the power tool tracking clip 102 to the power tool 106.

FIG. 11C depicts the power tool tracking clip 102 fastened together with the power tool bit clip 1120 to the power tool 106. In this example, mounting holes of the power tool bit clip 1120 align with the mounting features 218 of the power tool tracking clip 102 and the accessory mounting features 1100 of the power tool 106. Screws are inserted into the mounting holes and mounting features 218 and 1100 to fasten the power tool bit clip 1120 and the power tool tracking clip 102 to the power tool 106.

Figure 11D:
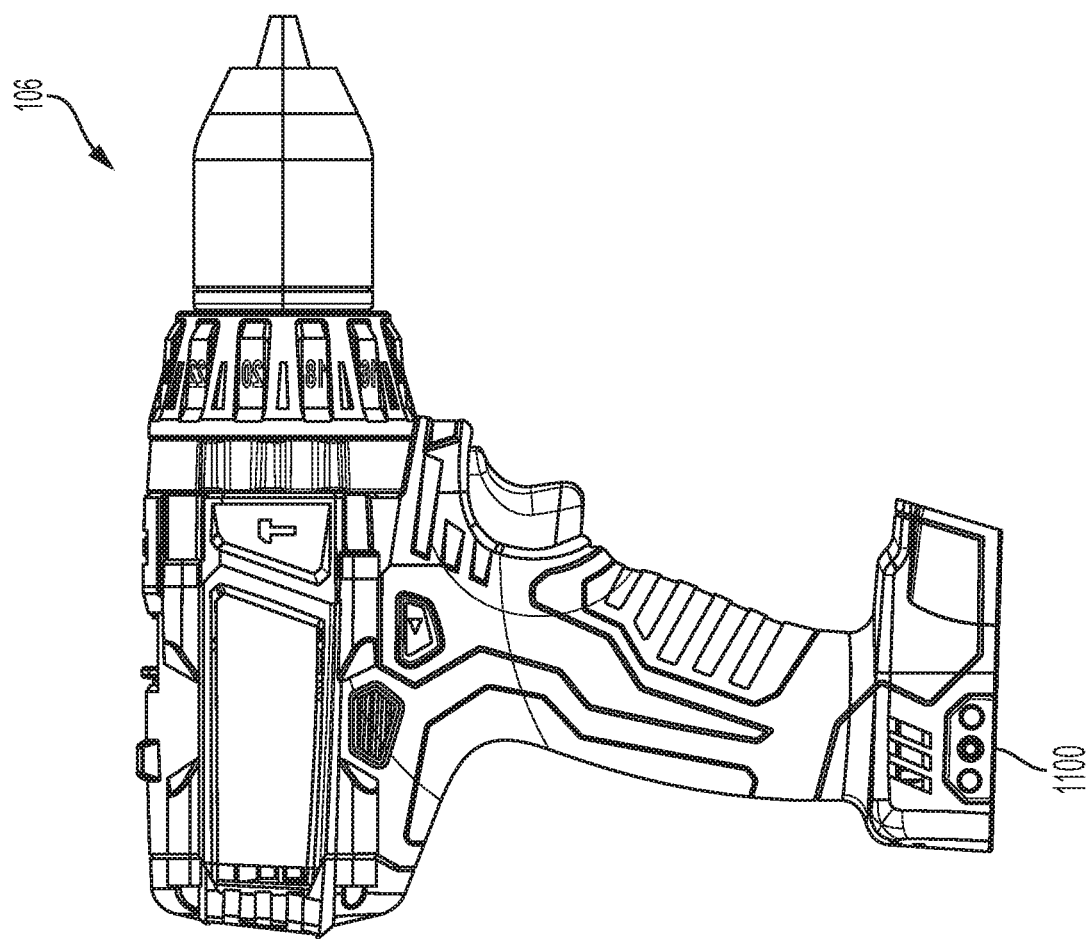
FIGS. 11D and 11E illustrate a power tool with the tracking clip removed, according to some embodiments.
Figure 11E:
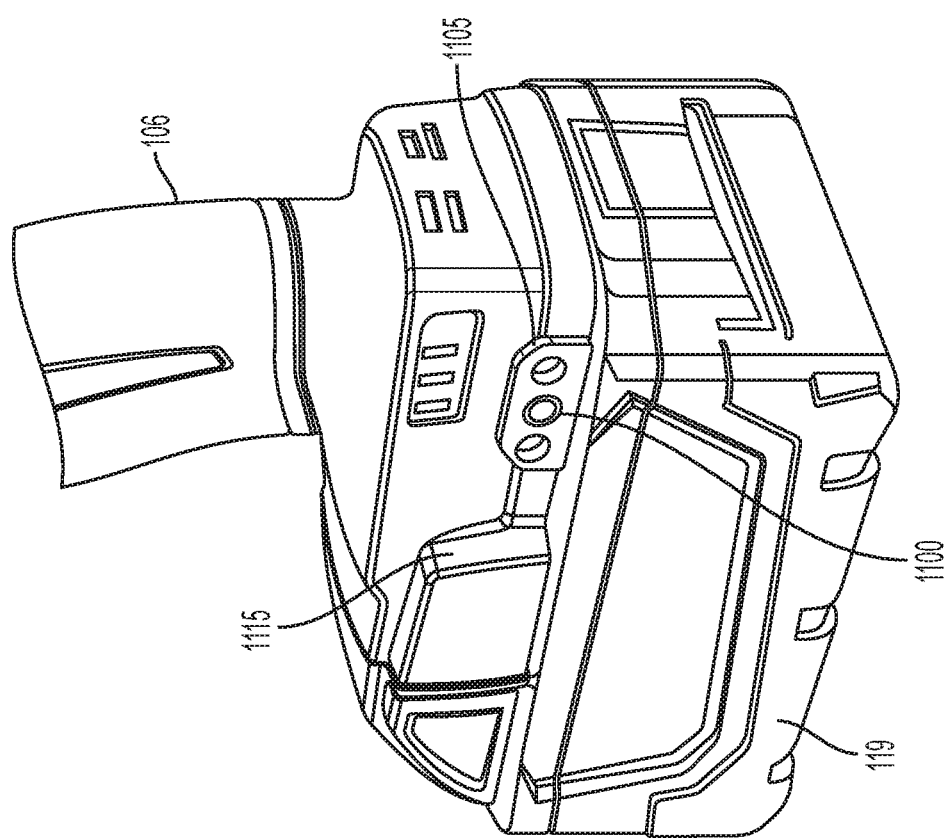

FIGS. 11D and 11E illustrate the power tool 106 with the tracking clip 102 removed, according to some embodiments. As noted above, the power tool 106 includes the accessory mounting features 1100 with the projection portions 1105, and includes the abutments 1115.

Figure 12:
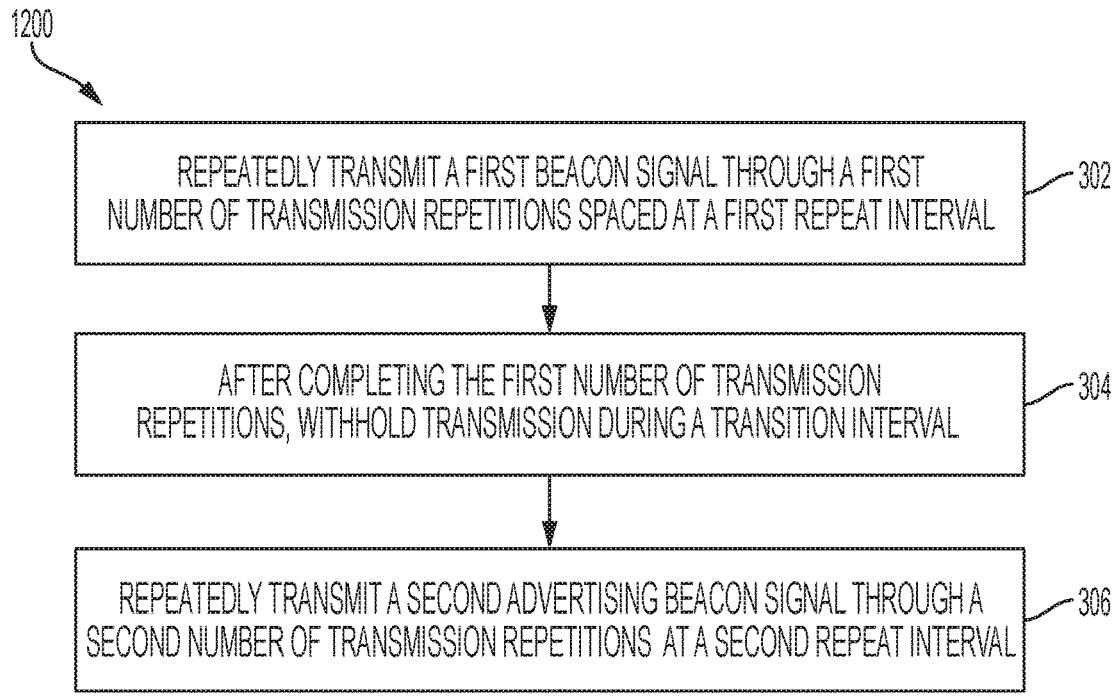
FIG. 12 is a flowchart for a method of communication by a beacon transmitter for reporting location of a device according to some embodiments.

FIG. 12 is a flowchart for a method 1200 of communication by a beacon transmitter for location reporting according to some embodiments. The method of FIG. 12 is described with respect to the system 100; however, the method may be similarly applicable to other devices and systems. In block 302, the wireless beacon transmitter 104 repeatedly transmits a first beacon signal through a first number of transmission repetitions spaced at a first repeat interval. In some embodiments, the first beacon signal is a signal for alerting a receiving application (e.g., of the personal wireless device 114) to the presence of the wireless beacon transmitter 104 that is transmitting the second advertising beacon signal. In some embodiments, the first beacon signal is a signal using a first open protocol, such as iBeacon™, rather than a proprietary protocol.

After completing the first number of transmission repetitions, the wireless beacon transmitter 104 withholds further transmission (e.g., of the first beacon signal) during a transition interval (block 304). After the transition interval, the wireless beacon transmitter 104 repeatedly transmits a second advertising beacon signal through a second number of transmission repetitions at a second repeat interval (block 306). In some embodiments, the second advertising beacon signal is a signal for providing identification of a device (e.g., the wireless beacon transmitter 104) transmitting the second advertising beacon signal. In some embodiments, the second advertising beacon signal is a signal using a second proprietary protocol, rather than an open protocol, that is different than the protocol of the first beacon signal.

In some embodiments, the first repeat interval of block 302 is of a length different from a length of the second repeat interval of block 306. In some embodiments, the first repeat interval of block 302 is of a fixed length different from a fixed length of the second repeat interval of block 306. In some embodiments, the first repeat interval of block 302 is of a length that is less than a length of the second repeat interval of block 306, such as less than $\frac{1}{50}^{th}$ of a length of the second repeat interval of block 306. In some embodiments, the first repeat interval is set at 100 ms for purposes of standards compliance. In some embodiments, the second repeat interval is 7.8 seconds to compromise between transmitter battery life and user experience. In some embodiments, an overall cycle time of 40 seconds results from the selection of the two intervals. In some embodiments, the first repeat interval and the second repeat interval are selected to be the same. One of ordinary skill in the art will readily ascertain, in light of having read the present disclosure that the selection of particular repeat intervals and cycle times will vary between embodiments without departing from the scope and intent of the present disclosure.

In some embodiments, after completing the second number of transmission repetitions in block 306, the process returns to block 302 to perform the repeated transmissions of the first beacon signal through the first number of transmission repetitions spaced at the first repeat interval. In some embodiments, a terminal interval elapses between the completing the second number of transmissions in block 306 and returning to block 302 perform the repeatedly transmitting the first beacon signal through the first number of transmission repetitions spaced at the first repeat interval.

Figure 13:
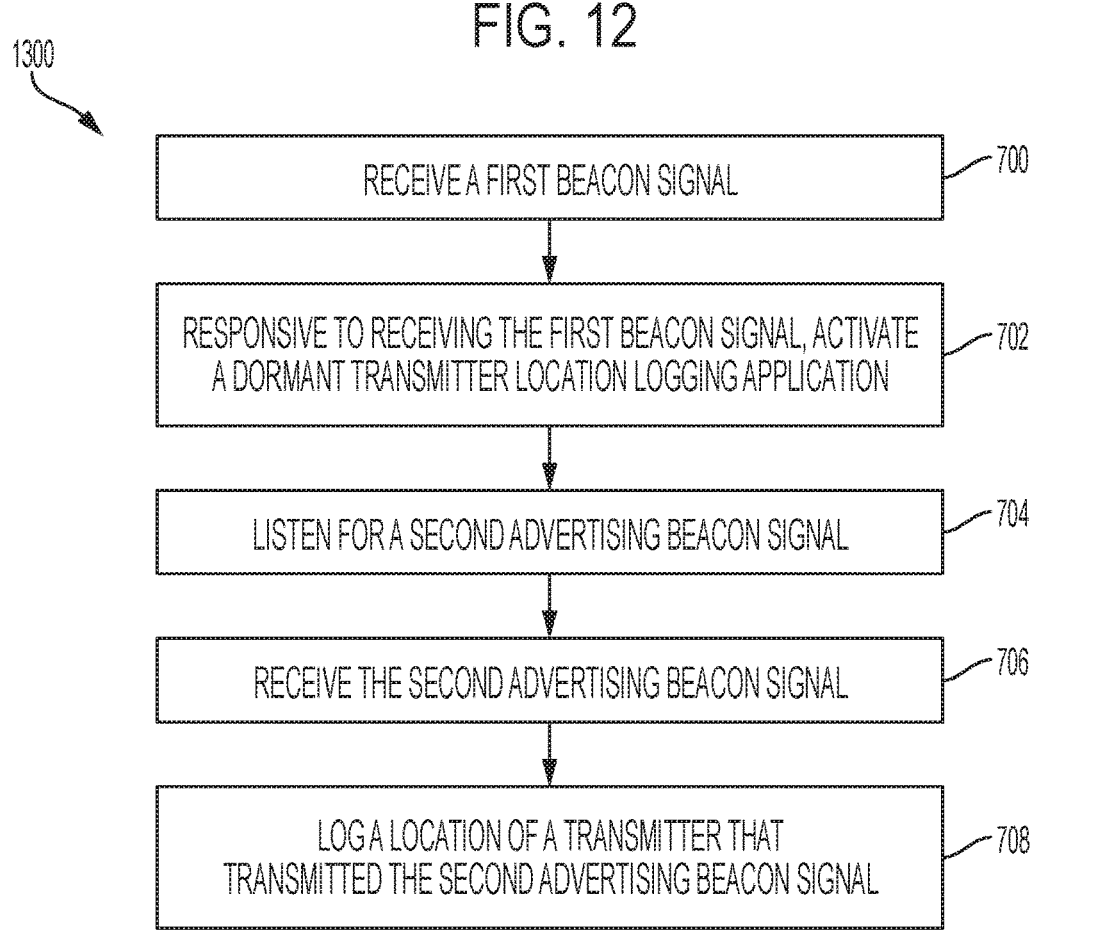
FIG. 13 is a flowchart of a method for implementing location reporting in a receiving device in communication with a wireless beacon transmitter of a power tool tracking clip, according to some embodiments.

FIG. 13 is a flowchart for a method for implementing location reporting for a receiving device in communication with a wireless beacon transmitter device according to some embodiments. A method 1300 of FIG. 13 is described with respect to the system 100; however, the method may be similarly applicable to other devices and systems. In block 700, the personal wireless device 114 receives a first beacon signal from the wireless beacon transmitter 104. Responsive to receiving the first beacon signal, a dormant transmitter location logging application executing on the personal wireless device 114 is activated (block 702). In some embodiments, an operating system of the personal wireless device 114 receives the first beacon signal and activates the dormant transmitter location logging application. In some embodiments, the first beacon signal is a signal using a first open protocol for alerting the receiving application to the presence of the wireless beacon transmitter 104 transmitting the second advertising beacon signal.

The transmitter location logging application of the personal wireless device 114 listens for a second advertising beacon signal (block 704). For example, to listen, the personal wireless device 114 may execute a software loop that repeatedly checks for a second advertising beacon signal being received by a wireless antenna of the personal wireless device 114. In block 706, the personal wireless device 114 receives the second advertising beacon signal, such as one of a plurality of second beacon signals, from the wireless beacon transmitter 104.

In block 708, a location of the wireless beacon transmitter 104 that transmitted the second advertising beacon signal is logged by the transmitter location logging application of the personal wireless device 114. For example, upon receipt of one of the plurality of second advertising beacon signals including beacon data, the personal wireless device 114 determines the transmitter identifier of the wireless beacon transmitter 104 based on beacon data, and determines the location of the personal wireless device 114 based on an output from a global navigation satellite system (GNSS) receiver of the personal wireless device 114. As one of skill in the art will readily ascertain from having read the present disclosure, while GNSS is described as an example of location detection, embodiments will include other forms of location awareness, such as registration of location (e.g. stored in a memory as part of an initial set-up) or location detection through detection of wireless networks, without departing from the scope and intent of the present disclosure. The personal wireless device 114 logs (e.g., stores in a memory) the determined location with the transmitter identifier of the wireless beacon transmitter 104 such that the location of the personal wireless device 114 is logged as the location of the wireless beacon transmitter 104.

In some embodiments, the additional information may be logged by the personal wireless device 114 for the wireless beacon transmitter 104 in block 708. For example, additional information from the beacon data including one or more of a user identifier, user contact information, timestamp, state of charge of the battery 110, and other status information may be logged for the wireless beacon transmitter 104 in block 708. Furthermore, additional information from the personal wireless device 114 may be logged for the wireless beacon transmitter 104 in block 708, such as a timestamp (e.g., when not provided as part of the beacon data) and receiving device identifier that identifies the personal wireless device 114 or the user thereof. The data that is logged by the personal wireless device 114 in block 708 may be referred to as logged data for the wireless beacon transmitter 104.

In some embodiments, the personal wireless device 114 further sends the logged data, including the transmitter identifier and location of the wireless beacon transmitter 104 to the location server 116 for storage and processing. In some embodiments, the receiving device sends the logged data to the location server 116 each time block 708 is executed. In other embodiments, the receiving device may be configured to delay sending the logged data when the receiving device has already sent similar data recently (e.g., within the past minute, ten minutes, or hour) to limit data transmissions and conserve power. In some embodiments, delaying transmission of the logged data enables the receiving device to obtain further logged data for other beacon transmitters using a similar process and to bundle the logged data for multiple beacon transmitters for a single transmission.

In some embodiments, the method of FIG. 13 further includes, during execution of steps 700-706, the personal wireless device 114 waiting through a first number of transmission repetitions of the wireless beacon transmitter 104 spaced at a first repeat interval, after the first number of transmission repetitions, waiting during a transition interval, and, thereafter, receiving the second advertising beacon signal through a second number of transmission repetitions of the wireless beacon transmitter 104 spaced at a second repeat interval.

In some embodiments, the method of FIG. 13 occurs in the background of the personal wireless device 114 such that the receiving and logging of information related to the wireless beacon transmitter 104 occurs without particular notifications to a user of the personal wireless device 114 of the particular receiving and logging. For example, although the transmitter location logging application may be activated from a dormant state, the activation may occur in the background such that an application on the personal wireless device 114 currently displaying information on the personal wireless device 114 is not interrupted or altered to provide a notification of the activation. Similarly, the logged data may be logged on the personal wireless device 114 and sent to the location server 116 for logging without a particular notification of these actions being provided to the user of the personal wireless device 114.

In some embodiments, in addition to being able to be activated upon receipt of the first beacon signal (e.g., as described with respect to blocks 700 and 702), the transmitter location logging application of the personal wireless device 114 may also be activated in response to receiving a user activation input through a user interface. For example, the user activation input may include a user input indicating a selection of the transmitter location logging application for execution. In response to the user activation input, the receiving device proceeds to block 704-708 as previously described.

Figure 14:
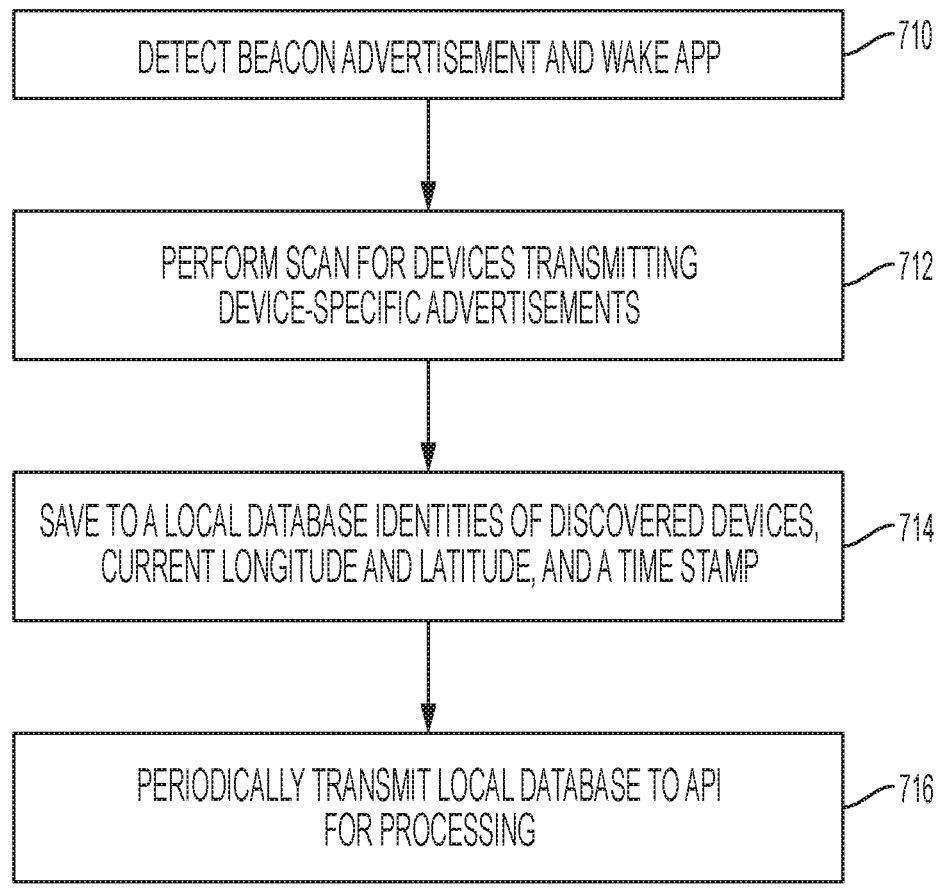
FIG. 14 is a flowchart for a method of implementing location reporting for a receiving device in communication with a beacon transmitter, according to some embodiments.

FIG. 14 is a flowchart for a method for implementing location reporting for a receiving device in communication with a wireless beacon transmitter according to some embodiments. The method of FIG. 14 is described with respect to the system 100; however, the method may be similarly applicable to other devices and systems. In block 710, the personal wireless device 114 detects a beacon advertisement, such as one of a first beacon signal from the wireless beacon transmitter 104. Responsive to detecting the beacon advertisement, personal wireless device 114 wakes a dormant app for transmitter location logging. In some embodiments, an operating system of the personal wireless device 114 receives the beacon advertisement and wakes the dormant transmitter location logging application. In some embodiments, the beacon advertisement is a signal using a first open protocol for alerting the receiving application to the presence of the wireless beacon transmitter 104 transmitting the second advertising beacon signal. In some embodiments, the detected beacon advertisement is a generic beacon advertisement that is not filtered based on, for example, the device type or device manufacturer that transmitted the beacon advertisement. In other embodiments, a beacon advertisement is considered detected in step 710 after the personal wireless device 114 determines that the beacon advertisement is a specific beacon advertisement including information indicating that the beacon advertisement was transmitted from a device of a particular type or manufacturer.

The personal wireless device 114 then performs a scan (e.g., a Bluetooth™ scan) for devices transmitting device-specific advertisements (block 712). For example, to scan, the personal wireless device 114 may execute a software loop that repeatedly checks for a device-specific advertising beacon signal being received by a wireless antenna of the personal wireless device 114. In block 714, the personal wireless device 114 discovers the device associated with each received device-specific advertising beacon signal and, in response, saves to a local database the identity of each discovered device, a current longitude and latitude, and a time stamp.

For example, upon receipt of one of the device-specific advertisements, such as a plurality of second advertising beacon signals, including the beacon data, the personal wireless device 114 determines the transmitter identifier of the wireless beacon transmitter 104 based on the beacon data, and determines the location of the personal wireless device 114 based on an output from a global navigation satellite system (GNSS) receiver of the personal wireless device 114. The personal wireless device 114 logs (e.g., stores in a memory) the determined location with the transmitter identifier of the wireless beacon transmitter 104 such that the location of the personal wireless device 114 is logged as the location of the wireless beacon transmitter 104.

In some embodiments, the personal wireless device 114 further sends the logged data, including the transmitter identifier and location of the wireless beacon transmitter 104 to the location server 116 for storage and processing by periodically transmitting the data in the local database to an API for processing (block 716). In some embodiments, the receiving device sends the logged data to the location server 116 each time block 714 is executed. In other embodiments, the receiving device may be configured to delay sending the logged data when the receiving device has already sent similar data recently (e.g., within the past minute, ten minutes, or hour) to limit data transmissions and conserve power. In some embodiments, delaying transmission of the logged data enables the receiving device to obtain further logged data for other beacon transmitters using a similar process and to bundle the logged data for multiple beacon transmitters for a single transmission.

In some embodiments, the method of FIG. 14 further includes, during execution of steps 710-716, the personal wireless device 114 waiting through a first number of transmission repetitions of the wireless beacon transmitter 104 spaced at a first repeat interval, after the first number of transmission repetitions, waiting during a transition interval, and, thereafter, receiving the second advertising beacon signal through a second number of transmission repetitions of the wireless beacon transmitter 104 spaced at a second repeat interval.

In some embodiments, the method of FIG. 14 occurs in the background of the personal wireless device 114 such that the receiving and logging of information related to the wireless beacon transmitter 104 occurs without particular notifications to a user of the personal wireless device 114 of the particular receiving and logging. For example, although the transmitter location logging application may be activated from a dormant state, the activation may occur in the background such that an application on the personal wireless device 114 currently displaying information on the personal wireless device 114 is not interrupted or altered to provide a notification of the activation. Similarly, the logged data may be logged on the personal wireless device 114 and sent to the location server 116 for logging without a particular notification of these actions being provided to the user of the personal wireless device 114.

In some embodiments, in addition to being able to be activated upon receipt of the generic advertisement beacon (e.g., as described with respect to blocks 710), the transmitter location logging application of the personal wireless device 114 may also be activated in response to receiving a user activation input through a user interface. For example, the user activation input may include a user input indicating a selection of the transmitter location logging application for execution. In response to the user activation input, the receiving device proceeds to block 712-716 as previously described.

In some embodiments, the personal wireless device 114 generates and displays a user interface, for example, in response to a user selection of the wireless beacon transmitter 104 on an inventory interface displayed on the personal wireless device 114. The user interface includes an image, which may be of the wireless beacon transmitter 104, the power tool 106 on which the wireless beacon transmitter 104 is mounted. The displayed image may be stored on the personal wireless device 114 or the tracking database 112 and is associated with the wireless beacon transmitter 104 via, for example, the transmitter identifier of the wireless beacon transmitter 104. A map showing a logged location of the wireless beacon transmitter 104 may be displayed. The logged location may be the last known location of the wireless beacon transmitter 104 obtained from a memory of the personal wireless device 114 or the tracking database 112. A timestamp associated with the logged location may also be illustrated on the user interface. The user interface further displays information about the wireless beacon transmitter 104 (e.g., obtained from the tracking database 112 or a memory of the personal wireless device 114).

A missing device control for reporting the wireless beacon transmitter 104 missing is also displayed. The personal wireless device 114 is operable to receive, via the missing device control, user input that indicates that the wireless beacon transmitter 104 (identified by the displayed information) is lost. The personal wireless device 114, in response, communicates lost device information to the tracking database 112 including one or more of a transmitter identifier of the wireless beacon transmitter 104, an indication that the wireless beacon transmitter 104 is lost, a timestamp, a user identifier, user contact information, and personal wireless device identifier. In response to receiving the lost device information, the location server 116 updates the tracking database 112 to indicate that the wireless beacon transmitter 104 is lost (e.g., sets the lost/not-lost indicator to "lost"), and may update the wireless beacon transmitter 104 data in the tracking database 112 with other of the lost device information as well. For example, the user contact information associated with the wireless beacon transmitter 104 on the tracking database 112 may be updated to contact information for the personal wireless device 114 that is reporting the wireless beacon transmitter 104 lost.

As can be appreciated based on the previous description of the system 100 and related methods, after the wireless beacon transmitter 104 is reported lost, a second personal wireless device (similar to the personal wireless device 114) may later receive beacon data for the wireless beacon transmitter 104 (e.g., in accordance with the method of FIG. 13) and the resulting logged data is sent to the location server 116. The location server 116 may then determine that the wireless beacon transmitter 104 has been reported lost and provide a notification to the user. Accordingly, some embodiments may implement community tracking and finding of objects (each associated with one of the wireless beacon transmitters 104) using a plurality of personal wireless devices 114 and the location server 116.

Embodiments of location logging module and/or of the various location logging methods and techniques as described herein may be executed on one or more computer systems, which may interact with various other devices. In different embodiments, the computer system may be any of various types of devices, including, but not limited to, a personal computer system, desktop computer, laptop, notebook, or netbook computer, mainframe computer system, handheld computer, mobile telephone (e.g., a smart phone), workstation, network computer, a camera, a set top box, a mobile device, a consumer device, video game console, handheld video game device, application server, storage device, a peripheral device such as a switch, modem, router, or another type of computing or electronic device. The computer system is an example of a computer system that may be configured to implement the location server 116 (FIG. 1), and of a computer system that may be configured to implement the personal wireless device 114 (FIG. 1).

The computer system may include one or more processors coupled to a system memory via an input/output (I/O) interface, a network interface coupled to the I/O interface, and one or more input/output devices, such as cursor control device, keyboard, and display(s). In some embodiments, it is contemplated that embodiments may be implemented using a single instance of computer system, while in other embodiments multiple such systems, or multiple nodes making up the computer system, may be configured to host different portions or instances of embodiments. For example, in one embodiment some elements may be implemented via one or more nodes of computer system that are distinct from those nodes implementing other elements.

In some embodiments the power tool 106 includes a power tool battery pack or other power tool power supply, a tool controller, a tool motor, and a tool output component. The power tool power supply may include a circuit for connection to alternating current power, may include power generation components, such as a wind or solar generator, or may be a battery pack that may include one or more battery cells (e.g., lithium-ion cells) within a housing, which includes contacts and an attachment mechanism for selectively securing and removing the power tool battery pack to the power tool. The power tool 106 controller is coupled to and powered by the power tool power supply, and controls the tool motor to drive the tool output component. The tool output component may be, for example, a drill chuck. The tool controller may control the tool motor based on user input received via user input component, which may be, for example, a trigger. The power tool 106 may further include a tool housing that house the tool controller, and the tool motor.

The wireless beacon transmitter 104 may be coupled to the tool controller and the power tool power supply of the power tool 106. For example, the wireless beacon transmitter 104 may be powered by the power tool 106 power supply when present, and by the battery 110 of the wireless beacon transmitter 104 when the power tool 106 power supply is not coupled to the wireless beacon transmitter 104. Additionally, the wireless beacon transmitter 104 may communicate with the power tool 106 controller to, for example, (i) obtain tool usage data stored on a memory of the tool controller (e.g., obtained by sensors of the power tool 106) to send to the personal wireless device 114 and/or (ii) provide tool configuration data (e.g., that is sent to the tool controller for storage on a memory thereof) received from the personal wireless device 114. The wireless beacon transmitter 104, may store within the memory 160 (see FIG. 10) identifying information for the power tool 106, such as a product identifier (e.g., identifying the type of power tool) and a serial number (e.g., uniquely identifying the particular instance of the power tool 106). This identifying information of the power tool 106 may also be provided by the wireless beacon transmitter 104 as part of the beacon data transmitted with the second advertising beacon signal noted above.

Further, in some embodiments, the wireless beacon transmitter 104 acts as a repeater device that receives other beacon signals (e.g., similar to the beacon signals emitted by the wireless beacon transmitter 104) and repeats (i.e., transmits) those beacon signals using beaconing techniques as described herein.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

Thus, the invention provides, among other things, a systems and methods for location logging of transmission devices. Various features and advantages of the invention are set forth in the following claims.

We claim:

1. A power tool tracking clip, the power tool tracking clip comprising:
   a wireless beacon transmitter that includes a memory storing an identifier and a transmitter configured to wirelessly transmit the identifier to an external device;
   a clip body that has a beacon receptacle, wherein the wireless beacon transmitter is positioned within the beacon receptacle;
   a first arm member coupled to a first end of the clip body, the first arm member having a first inner surface configured to engage a power tool;
   a second arm member coupled to a second end of the clip body, the second arm member having a second inner surface configured to engage the power tool; and
   a mounting feature on the first arm member, the mounting feature aligning with a corresponding mounting feature on an outer wall of the power tool when the power tool tracking clip is mated to the power tool;
   wherein the mounting feature on the first arm member includes a screw hole that aligns with a corresponding screw hole on the corresponding mounting feature of the power tool for fastening the power tool tracking clip to the power tool.

2. The power tool tracking clip of claim 1, wherein the first arm member and the second arm member define an opening of a receiving portion of the power tool tracking clip configured to receive the power tool.

3. The power tool tracking clip of claim 2, wherein the opening has a u-shape.

4. The power tool tracking clip of claim 1, wherein in the second arm member includes a second mounting feature that aligns with another corresponding mounting feature on another outer wall of the power tool when the power tool tracking clip is mated to the power tool.

5. The power tool tracking clip of claim 1, wherein a belt clip accessory is secured to the first arm member or the second arm member.

6. The power tool tracking clip of claim 1, wherein a bit clip accessory is secured to the first arm member or the second arm member.

7. A power tool tracking clip, the power tool tracking clip comprising:
   a wireless beacon transmitter that includes a memory storing an identifier and a transmitter configured to wirelessly transmit the identifier to an external device;
   a clip body that has a beacon receptacle, wherein the wireless beacon transmitter is positioned within the beacon receptacle;
   a first arm member coupled to a first end of the clip body, the first arm member having a first inner surface configured to engage a power tool;
   a second arm member coupled to a second end of the clip body, the second arm member having a second inner surface configured to engage the power tool; and
   a mounting feature on the first arm member, the mounting feature aligning with a corresponding mounting feature on an outer wall of the power tool when the power tool tracking clip is mated to the power tool;
   wherein the first arm member and the second arm member are flexible and inwardly biased to grip the power tool.

8. The power tool tracking clip of claim 7, wherein the mounting feature on the first arm member includes a screw hole that aligns with a corresponding screw hole on the corresponding mounting feature of the power tool for fastening the power tool tracking clip to the power tool.

9. A method for tracking a power tool, the method comprising:
receiving a power tool in a power tool tracking clip having a clip body;
receiving in a beacon receptacle of the clip body a wireless beacon transmitter;
storing, in a memory of the wireless beacon transmitter, an identifier; and
wirelessly transmitting the identifier to an external device,
wherein the power tool tracking clip includes:
a first arm member coupled to a first end of the clip body, the first arm member having a first inner surface configured to engage the power tool;
a second arm member coupled to a second end of the clip body, the second arm member having a second inner surface configured to engage the power tool; and
a mounting feature on the first arm member, the mounting feature aligning with a corresponding mounting feature on an outer wall of the power tool when the power tool tracking clip is mated to the power tool; and
wherein the method further includes:
separating the power tool tracking clip from the power tool,
receiving a tracked object other than the power tool in an opening of a receiving portion of the power tool tracking clip defined by the first arm member and the second arm member, and
wirelessly transmitting the identifier to the external device after the tracked object is received by the power tool tracking clip.

10. The method of claim 9, wherein receiving of the power tool in the power tool tracking clip includes receiving the power tool in an opening of a receiving portion of the power tool tracking clip defined by the first arm member and the second arm member.

11. The method of claim 9, wherein receiving of the power tool in the power tool tracking clip includes receiving a fastener by a screw hole of the mounting feature on the first arm member and by an aligned screw hole on the corresponding mounting feature of the power tool.

12. The method of claim 9, further comprising:
receiving, by at least one selected from the group of the first arm member and the second arm member, at least one selected from the group of a belt clip accessory and a bit clip accessory.

13. A method for tracking a power tool, the method comprising:
receiving a power tool in a power tool tracking clip having a clip body;
receiving in a beacon receptacle of the clip body a wireless beacon transmitter;
storing, in a memory of the wireless beacon transmitter, an identifier; and
wirelessly transmitting the identifier to an external device,
wherein the power tool tracking clip includes:
a first arm member coupled to a first end of the clip body, the first arm member having a first inner surface configured to engage the power tool,
a second arm member coupled to a second end of the clip body, the second arm member having a second inner surface configured to engage the power tool, and
a mounting feature on the first arm member, the mounting feature aligning with a corresponding mounting feature on an outer wall of the power tool when the power tool tracking clip is mated to the power tool
wherein receiving of the power tool in the power tool tracking clip includes gripping the power tool by the first arm member and the second arm member, wherein the first arm member and the second arm member are flexible and inwardly biased to grip the power tool.

14. The method of claim 13, wherein receiving of the power tool in the power tool tracking clip includes receiving a fastener by a screw hole of the mounting feature on the first arm member and by an aligned screw hole on the corresponding mounting feature of the power tool.

15. A system for tracking a power tool, the system comprising:
a power tool including housing that includes
a battery pack interface configured to receive a battery pack, and
a mounting feature separate from the battery pack interface and not being configured to receive the battery pack,
a power tool tracking clip secured to the power tool, the power tool tracking clip including:
a wireless beacon transmitter that includes a memory storing an identifier and a transmitter configured to wirelessly transmit the identifier,
a clip body,
a first arm member coupled to a first end of the clip body, the first arm member having a first inner surface engaged with the power tool,
a second arm member coupled to a second end of the clip body, the second arm member having a second inner surface engaged to the power tool, and
a corresponding mounting feature on the first arm member, the corresponding mounting feature aligning with the mounting feature of the power tool when the power tool tracking clip is mated to the power tool,
wherein the power tool tracking clip is configured to be mounted to the mounting feature of the housing of the power tool.

16. The system of claim 15, wherein the clip body has a beacon receptacle and the wireless beacon transmitter is positioned within the beacon receptacle.

17. The system of claim 15, further comprising:
an external wireless device configured to receive the identifier from the wireless beacon transmitter of the power tool tracking clip, determine a geographical location, and transmit the identifier and the geographical location to a server.

18. The system of claim 17, further comprising:
a second external wireless device is configured to receive the identifier from the wireless beacon transmitter of the power tool tracking clip, determine a geographical location of the second external wireless device, and transmit the identifier and the geographical location of the second external wireless device to the server.

19. The system of claim 15, wherein the first arm member and the second arm member define an opening of a receiving portion of the power tool tracking clip configured to receive the power tool.

20. The system of claim 15, wherein the corresponding mounting feature on the first arm member includes a screw hole that aligns with a corresponding screw hole on the mounting feature of the power tool for fastening the power tool tracking clip to the power tool.

* * * * *